United States Patent [19]
Amateau et al.

[11] Patent Number: 5,799,398
[45] Date of Patent: Sep. 1, 1998

[54] METHOD FOR PRECISION GEAR FINISHING BY CONTROLLED DEFORMATION

[75] Inventors: Maurice F. Amateau; Nagesh Sonti, both of State College, Pa.

[73] Assignee: The Penn State Research Foundation, University Park, Pa.

[21] Appl. No.: 529,774

[22] Filed: Sep. 18, 1995

Related U.S. Application Data

[62] Division of Ser. No. 285,883, Aug. 4, 1994, Pat. No. 5,451,275, which is a continuation of Ser. No. 932,206, Aug. 19, 1992, abandoned.

[51] Int. Cl.[6] .................................................. B21D 53/28
[52] U.S. Cl. ........................................ 29/893.32; 148/586
[58] Field of Search .......................... 29/893, 32; 148/211, 148/586, 573

[56] References Cited

U.S. PATENT DOCUMENTS 4,373,973  2/1983  Cellitti et al. ............................ 148/211
4,415,377  11/1983  Pryor et al. ................................ 72/201
5,302,215  4/1994  Pfaffman ................................... 266/92

FOREIGN PATENT DOCUMENTS

WO 92/05897  4/1992  WIPO.

*Primary Examiner*—P. W. Echols
*Attorney, Agent, or Firm*—Thomas J. Monahan

[57] ABSTRACT

An apparatus and method are provided for the thermomechanical net shape finishing of precision gear tooth surfaces by controlled deformation into metastable austenitic condition. To this end, an arrangement of a fixed axis through-feed motion of workpiece and moving axes in-feed motion of two opposed rolling dies are utilized. By means of process control methods and architecture for accomplishing precision mechanical motions, thermal and environmental control and timely and automatic transfer of workpiece, high strength and high accuracy gear tooth contact surfaces are produced.

25 Claims, 25 Drawing Sheets

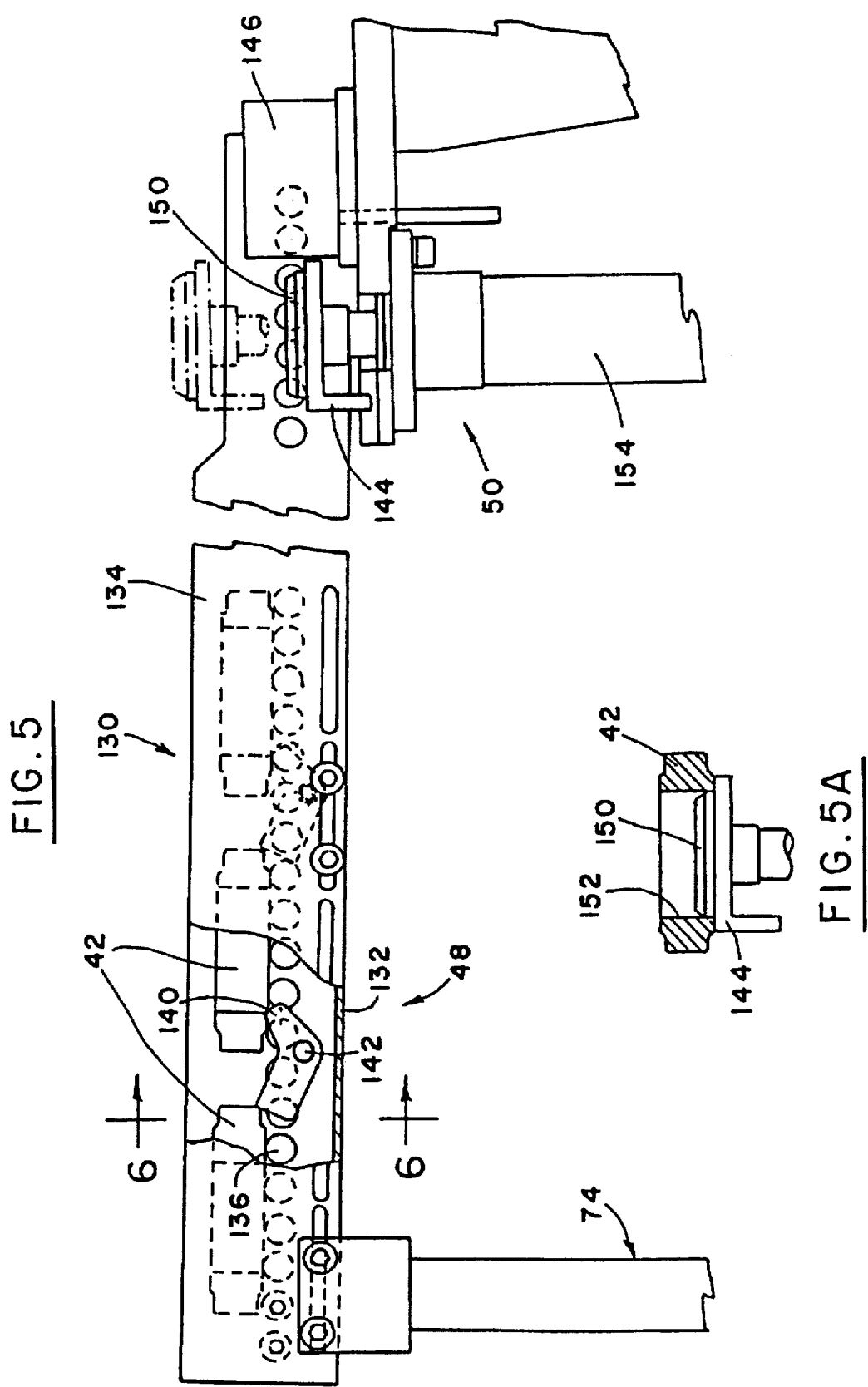

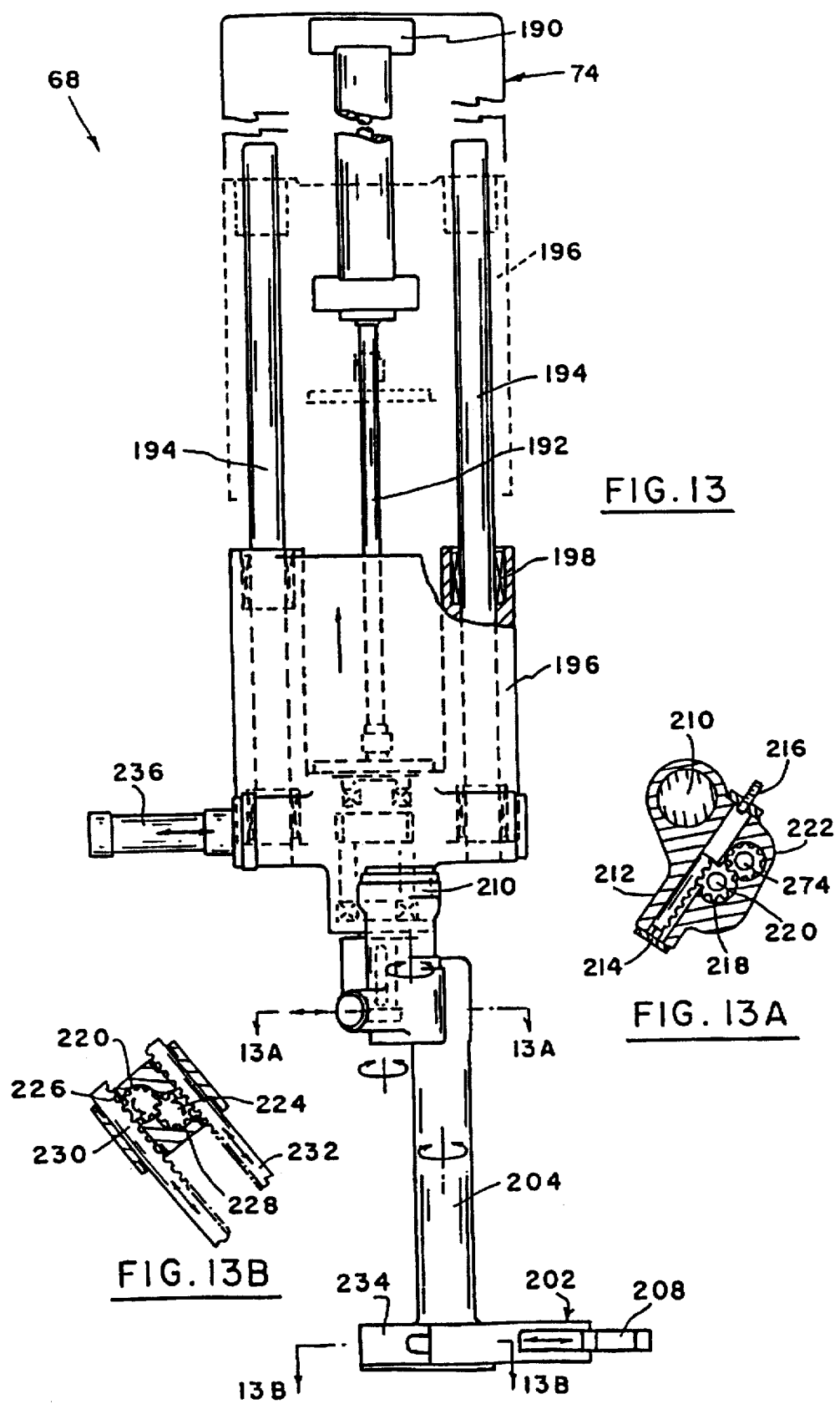

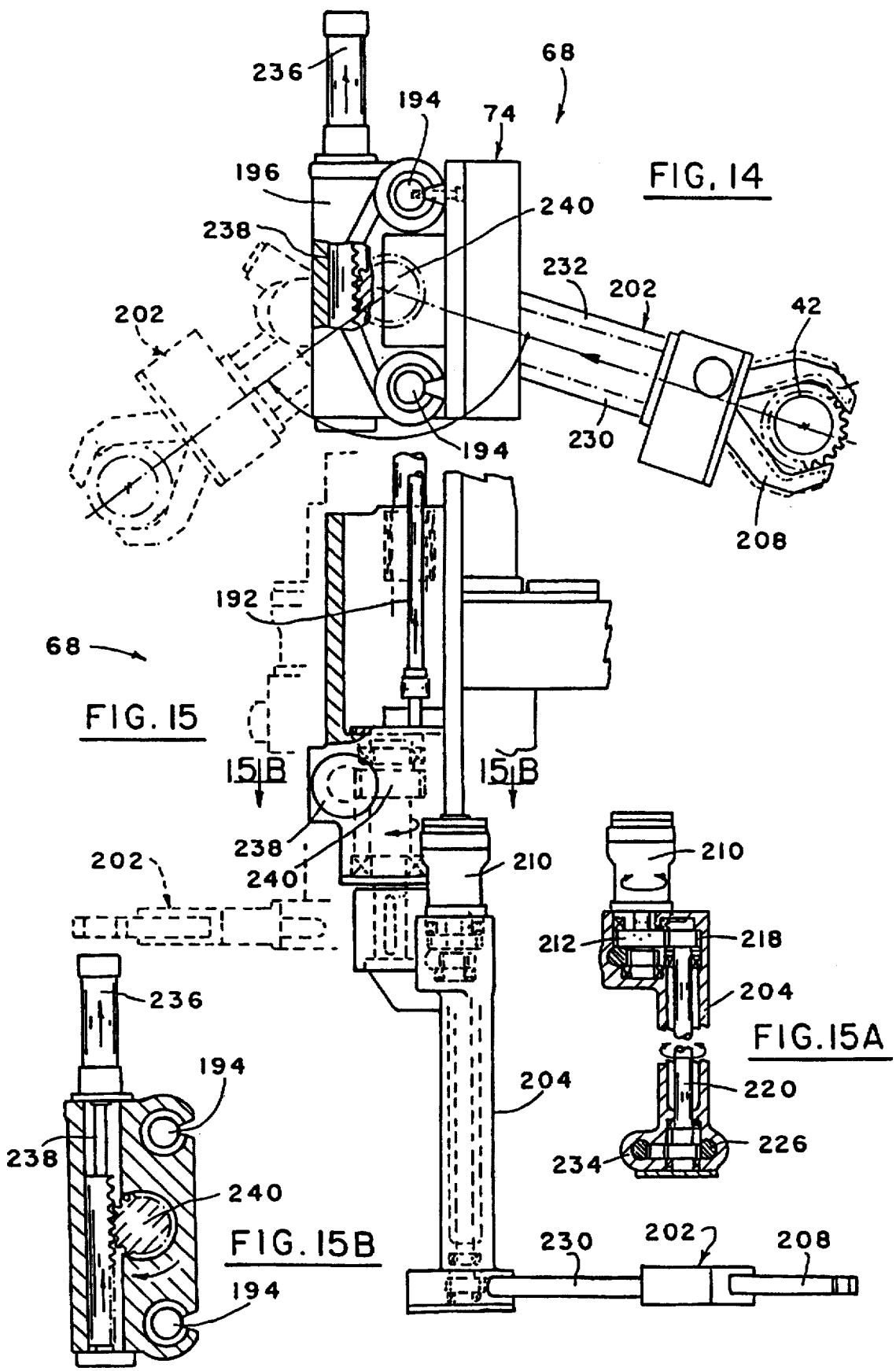

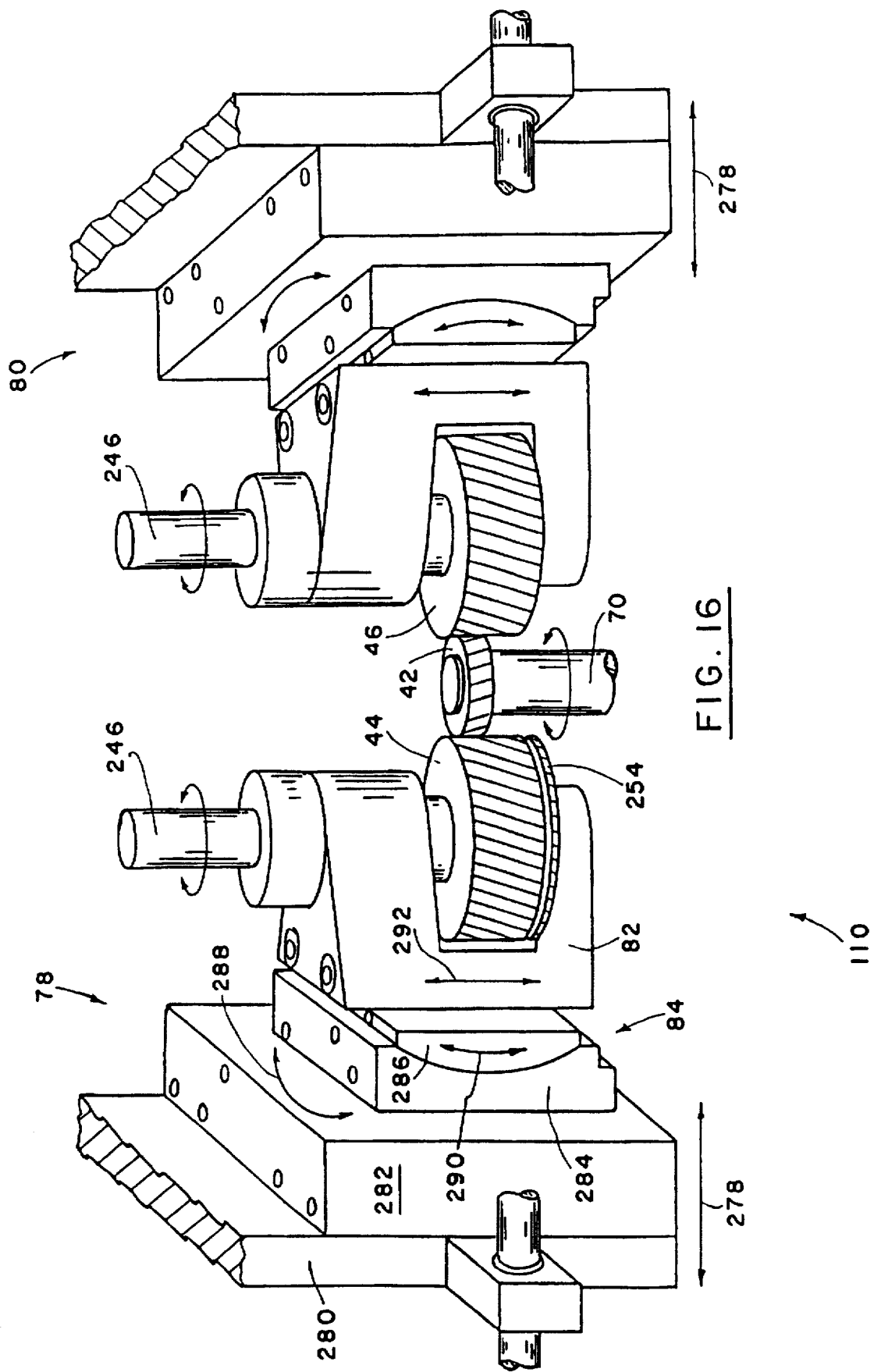

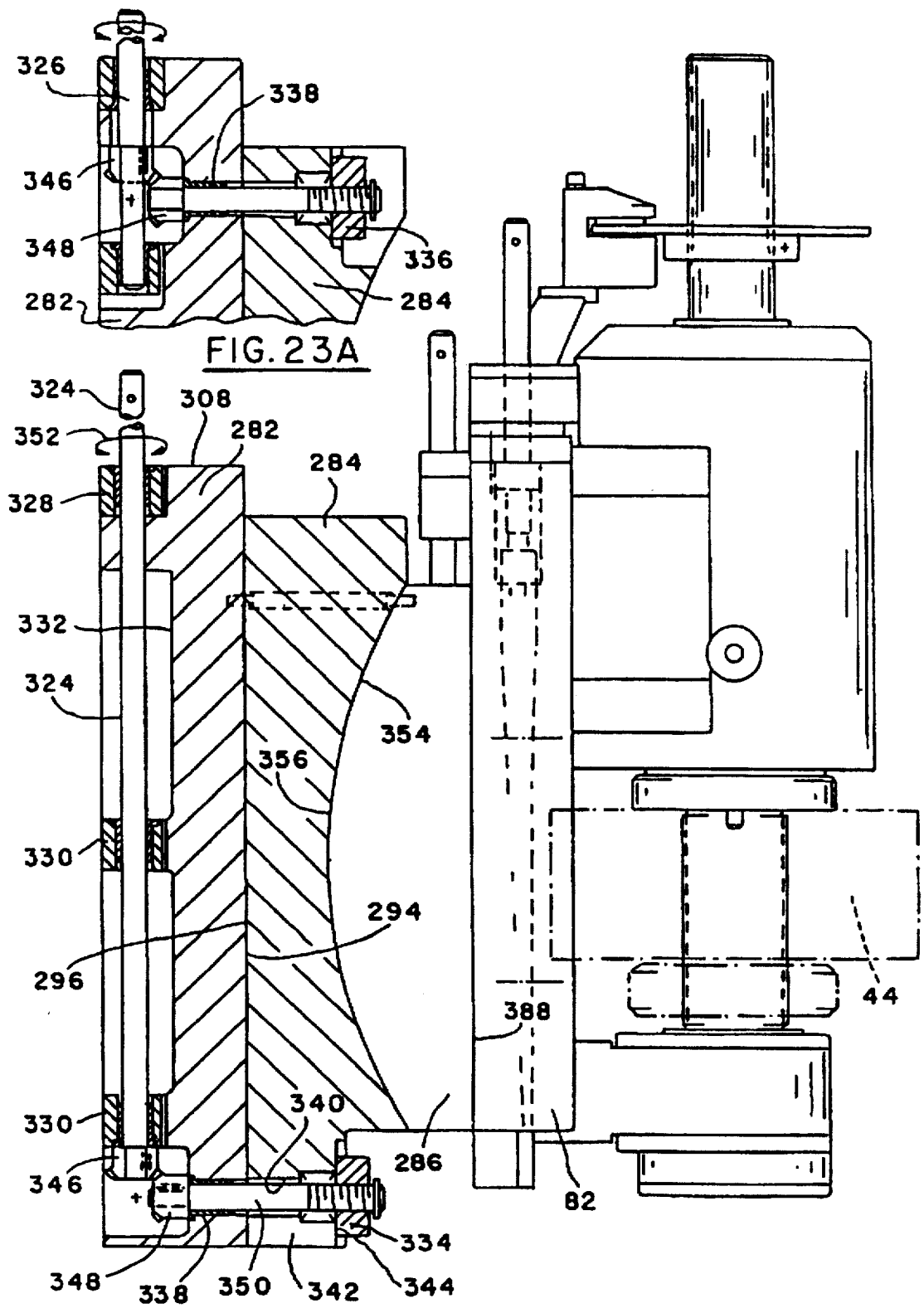

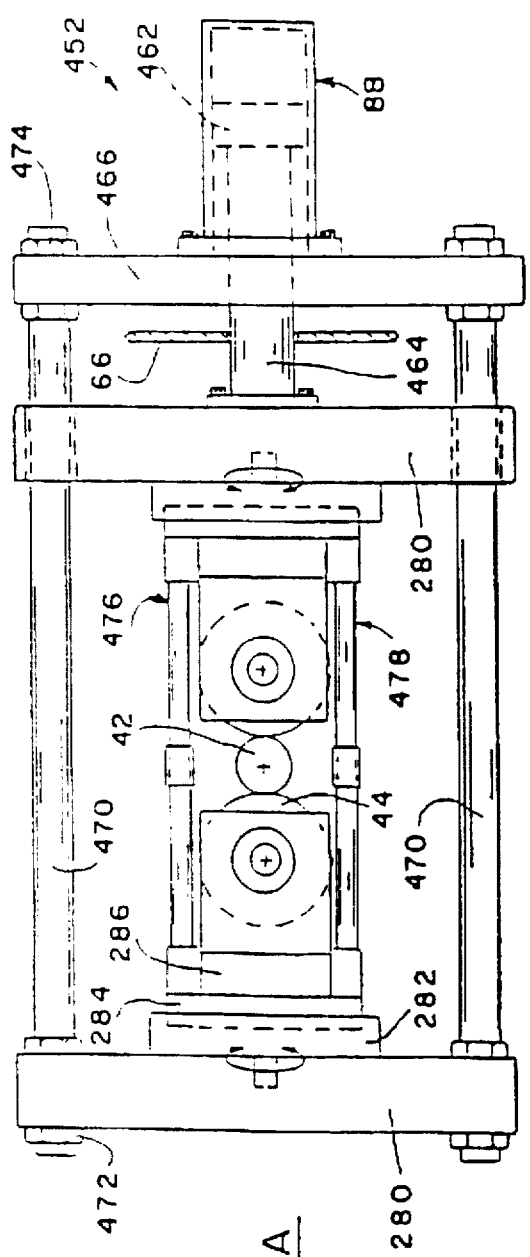
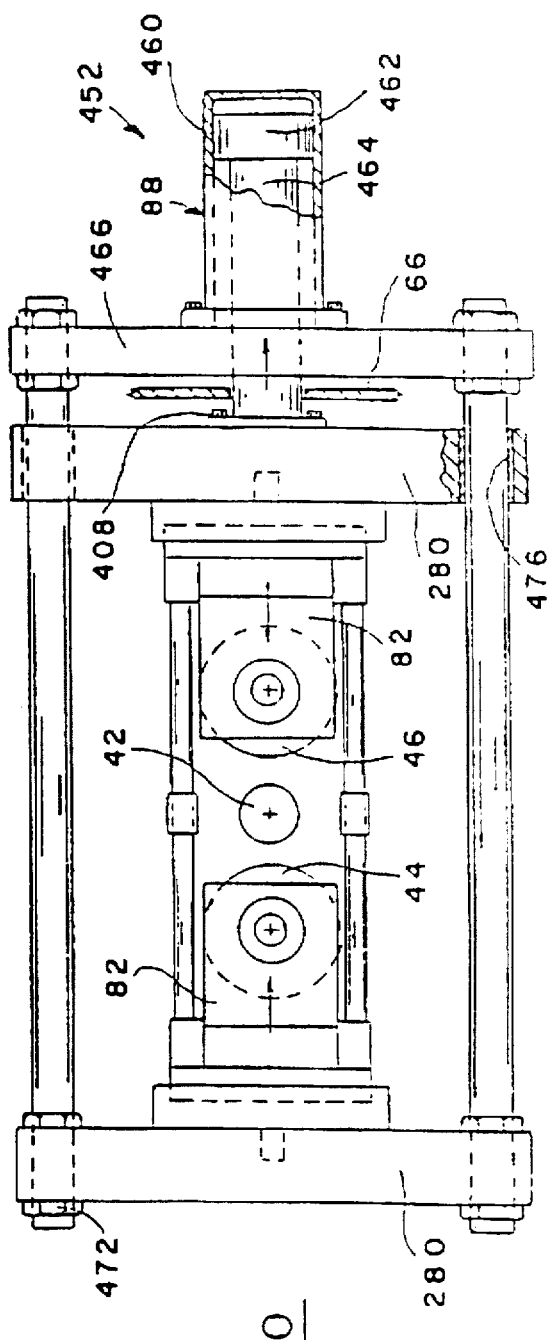

1

METHOD FOR PRECISION GEAR FINISHING BY CONTROLLED DEFORMATION

This is a divisional of application Ser. No. 08/285,883 filed on Aug. 4, 1994, now U.S. Pat. No. 5,451,275 issued Sep. 19, 1995, which is a continuation of U.S. application Ser. No. 07/932,206, Aug. 19, 1992, now abandoned.

BACKGROUND OF THE INVENTION

1. Field of the Invention

This invention relates to a process and apparatus for metallurgically treating high performance steel gears by thermomechanical means to produce high strength and accurate contact surfaces using controlled deformation net shape finishing techniques.

2. Discussion of the Prior Art

Highly loaded precision gears are normally manufactured by carburizing the surface layers of low carbon low alloyed steel gears, and reaustenitizing the entire gear and hardening by rapid quenching to below the temperature at which diffusionless transformations occur that result in the hardened martensitic structures. The hardened gears are then finished to net shape by hard finishing operations. A method was proposed in U.S. Pat. No. 4,373,973 in which a carburized gear is reaustenitized and quenched to above the $M_s$ temperature, roll finished, and then quenched to martensite prior to diffusional decomposition of the metastable austenite. However, no specific process details or apparatus are described in that patent which can accomplish this process.

In reducing the concept of U.S. Pat. No. 4,373,973 to practice, several inventions were necessary in both process control and apparatus to produce the metallurgical and dimensional accuracy requirements of precision gears. These inventions have been disclosed in a separate invention disclosure, commonly assigned application Ser. No. 07/829,187, filed Jan. 31, 1992, if M. Amateau et al., entitled "Apparatus and Method For Precision Gear Finishing by Controlled Deformation", the entire disclosure thereof being incorporated herein by reference. However, for ultra-high precision gears, an even closer control of the deformation process is required of the material flow pattern, degree and depth of deformation, and the metallurgical conditions of the gear tooth surface and subsurface layers. For instance, the gear finishing process as described in the disclosure of Ser. No. 07/829,187 utilizes in-feed and through-feed motions of the workpiece in relation to a single gear rolling die. The deformation mechanism related to such a rolling process with a single rolling die results in different material flow patterns on either side of the workpiece teeth, which can adversely effect the behavior of high performance gears. Further, gear roll finishing using a single rolling die can result in excessive deflections in the workpiece support spindle, which must be compensated for by prior machine settings.

By use of two rolling dies positioned on diametrically opposing sides of the workpiece, the material flow patterns as well as the high in-feed rolling forces can be balanced, resulting in a better control of the deformation process. Our invention is different from the conventional gear roll finishing equipment using two rolling dies, in that, for the latter, the first rolling die is typically held with a fixed axis and the second rolling die is moved, thereby applying the in-feed force and rolling action on the workpiece, and moving the workpiece towards the fixed rolling die at preset speeds. The required amount of deformation is controlled by setting a dead stop at a predetermined location, where the in-feed motion ends. Such a gear finishing process using two rolling dies, one fixed and the other moving for the in-feed motion, is generally used for cold rolling of uncarburized steels only, and is further limited to helical gears only.

To achieve the ausform-strengthening of surface layers of carburized parallel axis gear teeth for high performance applications, both in-feed and through-feed motions are required between the workpiece and the two rolling dies in a coordinated and controlled manner, and such a controlled deformation must be achieved with surface layers of the workpiece maintained in the metastable austenitic condition. The large in-feed and through-feed forces necessary to roll finish spur and helical gears to the high dimensional accuracy require a rigid through-feed mechanism holding the workpiece on a fixed axis, and coordinated and controlled in-feed motion of the two rolling dies towards the fixed axis workpiece. The degree of deformation must be controlled to very close tolerances by precise monitoring and control of the movements of each of the two rolling dies with respect to the workpiece. Further, the workpiece axis as well as the axes of the two rolling dies must be precisely aligned to achieve the high lead and profile accuracy specified for ultra-high precision gears. In addition, as the thermomechanical processing of the workpiece must be performed in a thermally stable bath to maintain the workpiece gear surfaces in the desired metastable austenitic condition during the forming process, any adjustments to the alignments between the workpiece and the rolling die axes must be made with the rolling apparatus maintained at the forming temperature. Moreover, the degree of deformation and metallurgical structures of the gear surface layers must all be maintained in a precisely controlled manner. The surface reaustenitization, the transformation to metastable austenitic condition, and the subsequent transformation to martensite, must be performed in a timely and controlled manner to achieve the optimum metallurgical condition at each stage of the thermomechanical processing.

SUMMARY OF INVENTION

In accordance with the present invention, there is provided an apparatus for precision gear finishing by controlled deformation using a fixed axis through-feed and coordinated and controlled moving axes in-feed of two rolling dies positioned on diametrically opposing sides of the workpiece. The invention also includes means for achieving controlled deformation, means for providing precise adjustment of the axes of the two rolling dies from a remote location while the rolling apparatus is thermally stabilized and maintained at the forming temperature and under an inert atmosphere, and means for performing a timely transfer of the workpiece to achieve the optimum metallurgical condition at each stage of the thermomechanical gear finishing process.

The essence of the invention is the apparatus for thermomechanical finishing of precision gears by controlled deformation using two rolling dies, and process control methods and architecture for accomplishing precision motions, thermal control, and environmental control with a combination of sensors, mechanisms and a software controlled sequence of operations. The control architecture allows precise mechanical movements of the through-feed motion of the workpiece and the in-feed motions of the two rolling dies in either the load control or position control mode of operation. Appropriate transducers and sensors are used to monitor each of these motions and loads, and are used to generate feedback signals, and thereby, the error signals used to drive the servo-controlled actuators for the in-feed and through-feed motions.

An integral material transfer mechanism comprised of an in-chute, a gear loader, a swivel robot, a transfer system to move the workpiece from the surface austenitization station to the rolling station, and another such system for transfer of the workpiece from the rolling station to the final quench station, has been devised for the timely and automatic positioning of the workpiece for surface austenitization, quenching to forming temperature and thermal stabilization, roll forming action using the through-feed and in-feed motions, and the final quenching to form the martensitic structures in the surface layers, all under an inert environment.

A spin/scan mechanism is integrated with the apparatus to spin as well as locate the workpiece in first an MF coil, and then an RF coil, and finally to stop spinning and then quench the workpiece rapidly into the forming medium maintained at the selected temperature. The power levels and heating times in the MF and RF induction heating cycles are suitably adjusted and preset to achieve the desired thermal gradients and depths of heating for contoured austenitization of the gear tooth surfaces. A high resolution optical pyrometer is used to monitor the temperature of the gear tooth surface as it is being induction heated for austenitization. The induction heating process can be controlled by either of two means: (1) by maintaining the preset MF and RF power levels for preselected respective times, or (2) until the measured surface temperatures for the MF and RF cycles reach their respective preset values.

After the gear surfaces have been austenitized, quenched and thermally stabilized to achieve the metastable austenitic condition, the gear is moved to the rolling station, and gripped by a remotely operated precision gear holding arbor mounted on the through-feed mechanism. An appropriate sequence of processing steps can then be performed depending on the type of gear, such steps to include engagement of the rolling dies with the workpiece, in-feeding of the rolling dies to final positions, through-feeding of the workpiece and the roll finishing operations, to achieve the controlled deformation using integrated and coordinated in-feed and through-feed motions. The finished workpiece is then transferred to the final quench station to transform the metastable austenite to martensite.

The process control architecture also allows programmed execution of predetermined processing steps, and is capable of performing such steps in the parallel processing mode in which one workpiece is thermally processed while another workpiece is being roll finished at the same time. A unique combination of mechanisms to transfer the workpiece between the various processing stations, software controlled process sequencing and control equipment, techniques to achieve surface austenitization and controlled deformation using coordinated and controlled through-feed of the workpiece and in-feed of the two rolling gear dies are all used to precisely deform the surface layers of the gear teeth, and hence perform the metallurgical operations required to thermomechanically finish precision gears.

Other and further features, advantages, and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate one of the embodiments of the invention, and, together with the description, serve to explain the principles of the invention in general terms. Like numerals refer to like parts throughout the disclosure.

BRIEF DESCRIPTION OF THE DRAWINGS

FIG. 5 is a detail side elevation view, partially cut away and shown in section, depicting part of a subsystem illustrated in FIG. 1;

FIG. 5A is a further detail side elevation view, partially in section, illustrating in greater detail a part of FIG. 5;

FIG. 9 is a detail side elevation view, partly cut away and in section, of a component illustrated in FIG. 1;

FIG. 13 is a front elevation view, partly cut away and shown in section, of a transfer mechanism utilized by the invention;

FIG. 13A is a cross-section view taken generally along line 13A—13A in FIG. 13;

FIG. 13B is a cross-section view taken generally along line 13B-13 in FIG. 13B;

FIG. 14 is a top plan view of the transfer mechanism illustrated in FIG. 13 and depicting different positions thereof;

FIG. 15 is a front elevation view of the transfer mechanism illustrated in FIG. 13;

FIG. 15A is a detail side elevation view, certain parts being cut away and shown in section, illustrating a part of the transfer mechanism of FIGS. 13, 14, and 15;

FIG. 15B is a cross-section view taken generally along line 15B—15B in FIG. 15;

FIG. 16 is a diagramatic perspective view illustrating the gear roll finishing mechanism of the invention;

FIG. 21A is a top plan view of the adjustment mechanism illustrated in FIG. 21;

FIG. 23 is a side elevation view of FIG. 18, certain parts being cut away and shown in section, for clarity;

FIG. 23A is a detail cross-section view of parts generally depicted in FIG. 23;

FIGS. 30 and 30A are top plan views illustrating two positions, respectively, of a coordinating mechanism utilized by the invention;

FIG. 32A is a cross-section view taken generally along line 32A—32A in FIG. 32.

DESCRIPTION OF THE PREFERRED EMBODIMENTS

Figure 1:
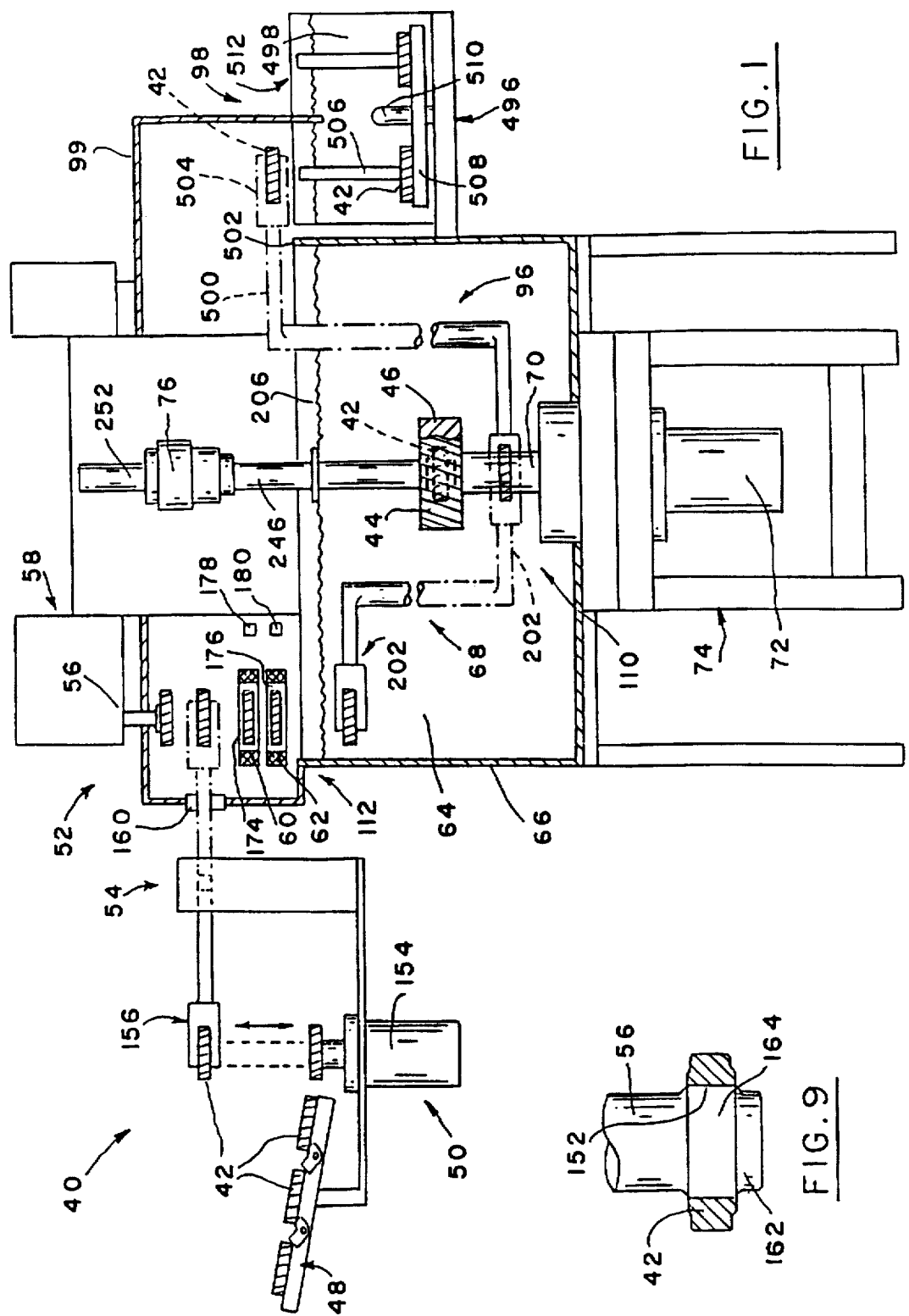
FIG. 1 is a side elevation view diagramatically illustrating apparatus, according to the invention, for performing precision gear finishing by controlled deformation.

Turn now to the drawings and initially to FIG. 1. FIG. 1 illustrates a preferred embodiment of a system 40 according to the invention devised for precision gear finishing by controlled deformation using a fixed axis through-feed of a workpiece 42 and in-feed of two rolling gear dies 44, 46 on moving axes. With continued reference to FIG. 1, a brief overview of the operation of system 40 will be provided, after which a more detailed description of the components of the system 40 will be related. The system 40 provides for the timely and automatic transfer of each workpiece 42 to a plurality of processing stations.

For purposes of the present disclosure, the workpiece 42 is referred to initially as a "near net shaped gear blank" and when all processes of the invention have been completed, it is referred to as a "net shaped gear". As a near net shaped gear blank, it may have been hobbed or otherwise formed using conventional techniques. As such, for purposes of the invention, the workpiece 42 is formed with its gear teeth approximately 0.001 to 0.002 inches oversized in tooth thickness relative to the final or desired size so that the gear can meet the dimensional tolerances of AGMA required for high performance gears without the necessity of grinding. The displacement of the metal during the deforming operations performed in accordance with the invention serves to remove the excess tooth thickness while assuring the proper profile. Grinding is eliminated, and for this reason alone, there can be as much as a 70% increase in surface durability at any given contact stress level.

At the entrance to the system 40, a workpiece in-chute 48 holds the workpieces to be processed and, upon command from a suitable software driven process controller, releases a workpiece to a gear loader 50 for subsequent transfer to a spin/scan induction heating station 52 by means of a swivel robot 54. The spin/scan station 52 includes a support spindle 56 to accept the workpiece from the swivel robot and servo-drives to impart linear and rotary motions to the workpiece. At appropriate times, the support spindle 56 positions the workpiece and drives it at appropriate linear and rotational speeds with respect to MF and RF induction coils 60, 62 respectively, in order for the surface austenitization to be performed then advances it into processing or quench media 64 in a processing tank 66. Contour austenitization of the gear tooth surfaces of each workpiece is achieved by energizing either or both of the MF and RF induction coils using their respective power supplies (not shown) and for appropriate periods of time. The complete surface austenitization cycle is controlled by a dedicated induction heating process controller (not shown), which in turn is supervised by a software driven process controller (not shown). After the induction austenitization of the gear tooth surfaces of the workpiece and the rapid quenching thereof to the metastable austenitic condition, a gear transfer mechanism 68 transfers the workpiece to a through-feed gear holding spindle 70 for the roll finishing process, as supervised by a process controller 100.

A through-feed actuator 72 is mounted on a rigid machine frame 74 of the system 40 and is connected to the through-feed spindle 70, allowing the workpiece both the translatory and rotary motions required for the rolling action. The processing tank 66 is designed to contain the processing or quench media 64 maintained at a temperature of up to 500° F. The tank is anchored to the rigid main frame 74 with suitable seals designed to contain the hot media. Housings for the rolling gear dies and the adjustment mechanisms to align the axes of the rolling gear dies in the in-plane, out-of-plane and axial direction (all to be subsequently described) are all contained in the processing or quench media 64 to maintain the rolling hardware at a thermally stable forming temperature.

The adjustments to the axes of the rolling gear dies are performed by remotely operated actuators, all as will be fully described below. The rolling gear dies 44, 46 are power driven through constant velocity joints 76 which allow in-feed motion of the rolling gear dies 44, 46 towards and away from the workpiece 42. This arrangement is particularly well seen in FIG. 2. The drive to at least one of the rolling gear dies is capable of phase adjustment so as to precisely align the rotational phase of one rolling gear die with respect to the other and thereby insure accurate engagement with the workpiece. Both complete in-feed assemblies 78, 80, including rolling gear die housings 82 and adjustment mechanisms 84 are guided on precision linear bearing elements 85 which, in turn, are suspended from bridge 86 of the rigid main frame 74. The in-feed forces and motions are provided by the two in-feed actuators 88 mounted on spaced columns 90, 92 of the rigid frame. The connections between the in-feed actuators 88 and the in-feed assemblies 78, 80 pass through the walls of the processing tank 66, and are properly sealed to prevent drainage of the processing or quench media 64 while allowing the linear in-feed motions.

Figure 3:
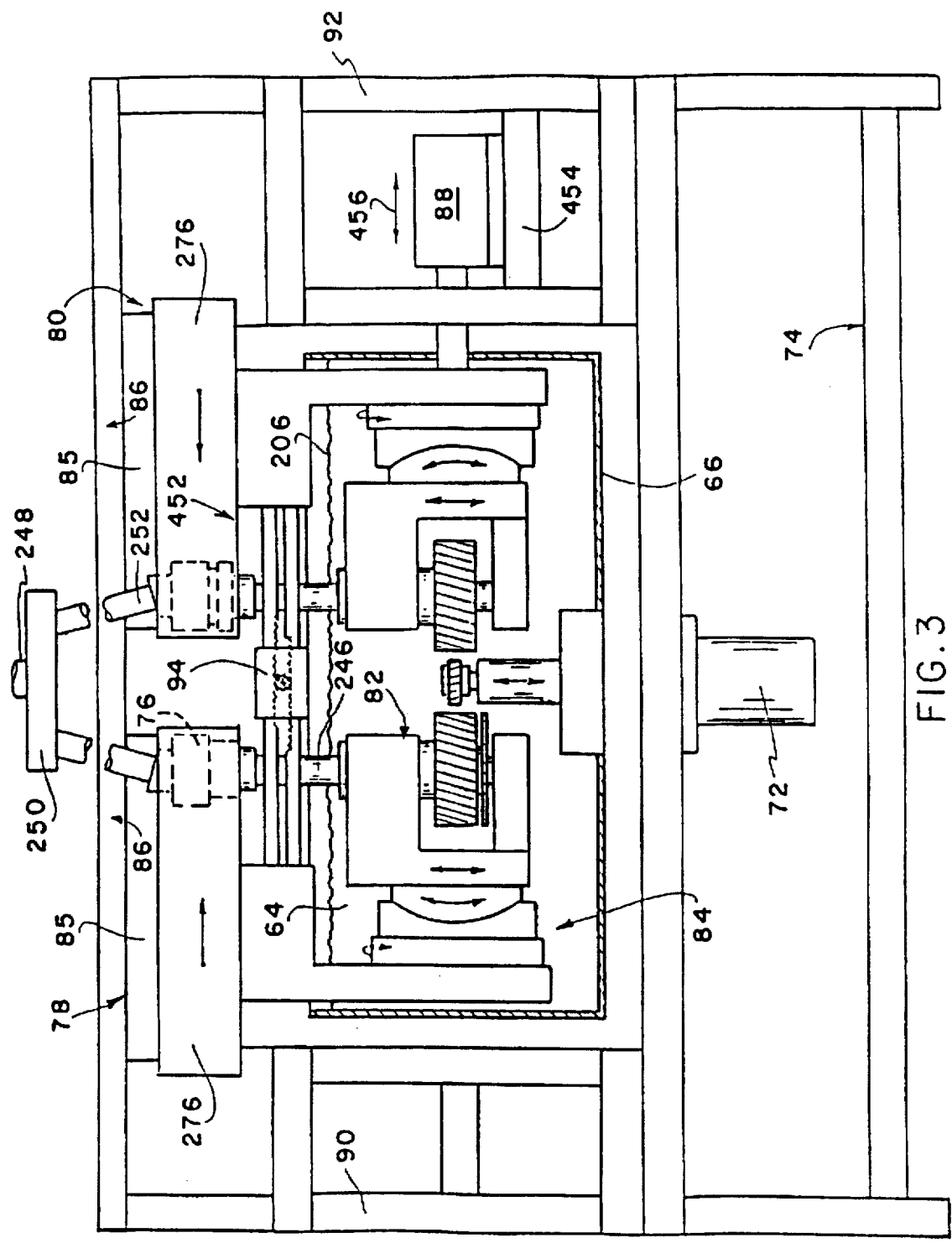
FIG. 3 is a front elevation diagramatic view similar to FIG. 2 but illustrating another embodiment thereof.

In an alternate embodiment shown diagrammatically in FIG. 3, a single in-feed actuator is used to provide the in-feed motion uniformly to both of the in-feed assemblies by means of a self-centering mechanism 94.

After the gear roll finishing cycle is completed, a gear transfer system 96, similar to transfer mechanism 68, then accepts the processed workpiece 42 and transfers it to an indexing quench station 98 (FIG. 1) for final transformation to martensite. The processed gear is finally unloaded from the indexing quench station for subsequent operations. Throughout the thermomechanical processing cycle including surface austenitization, rapid quench to metastable austenitic condition, roll finishing, and the final quench to martensite, an enclosure 99 contains and maintains an inert environment of nitrogen or argon, for example, to protect the gear tooth surfaces from oxidation, the recirculating inert gas being continuously monitored for oxygen level, and refurbished as required.

Figure 4:
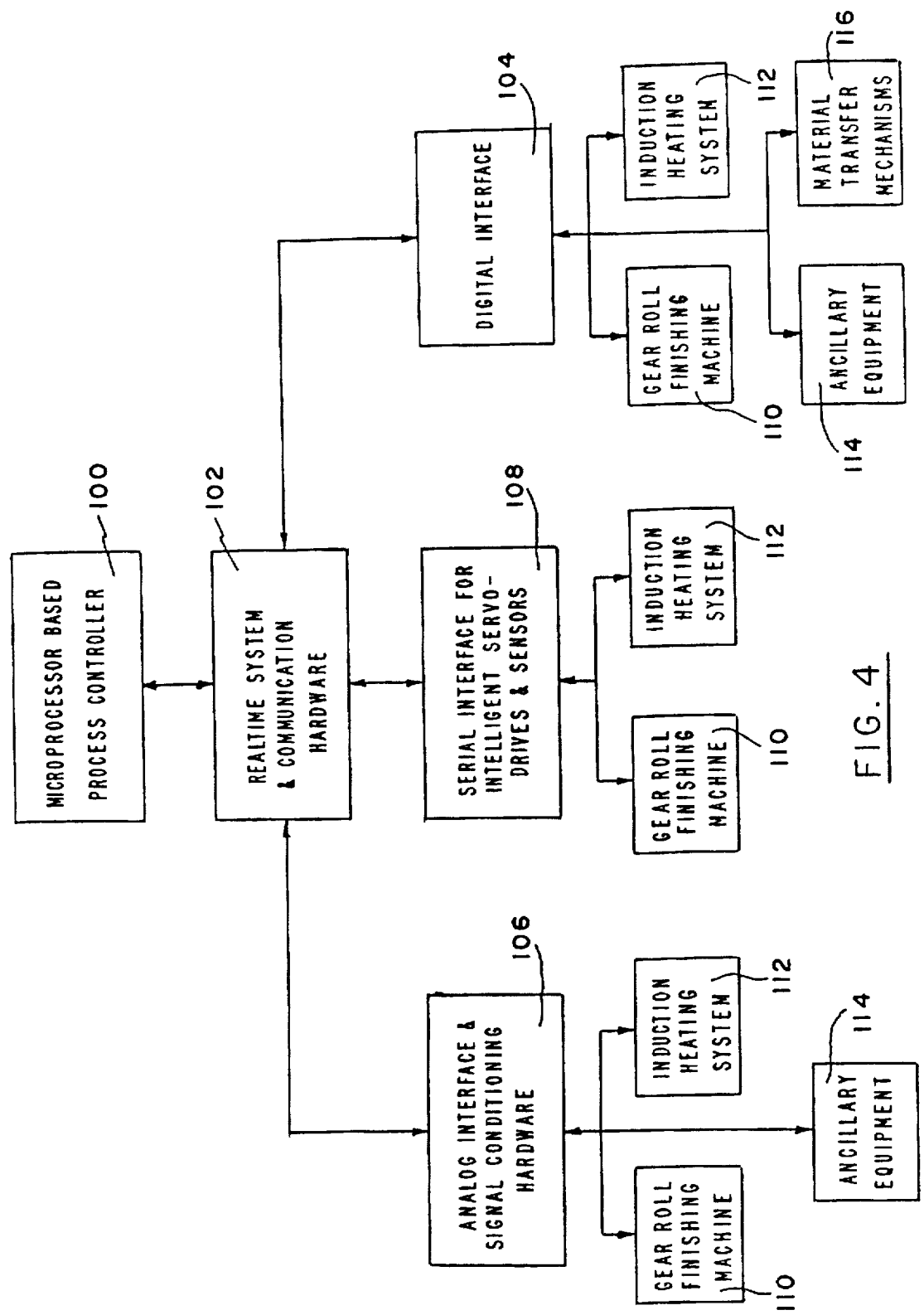
FIG. 4 is a schematic representation of control architecture for performing the invention.

FIG. 4 is a schematic representation of the control architecture for the thermomechanical net shape finishing system 40 and shows the interfacing and interconnections among the various hardware items comprising the system. As depicted in FIG. 4, a controller 100 acts as the overall processing system manager, controlling every operation of the components of the system in a software-driven, coordinated and controlled manner. The controller comprises a microprocessor based system 100 and real time system and communications hardware 102 including electronic interfacing and signal conditioning equipment. The control actions are achieved by digital interfacing 104, analog interfacing and signal conditioning 106, and serial interfacing 108 for intelligent servo-driver and sensors via digital/analog/serial input/output communications between the process controller and the thermomechanical net shape finishing system 40. The major functions of the process controller are (a) control of the gear roll finishing machine 110, (b) control of the induction heating system 112, (c) control of the ancillary equipment 114 which includes several units such as the processing media heating and recirculating unit, the quench media heating and recirculating unit, and the inert gas environment control system, and (d) control of the material transfer mechanism 116 for timely transfer of the workpiece for each of the processing steps involved, which have been described in earlier sections.

For programmed execution of the process sequence, the process controller operates the various material transfer mechanisms 116 which include modules such as the in-chute 48, gear loader 50, swivel robot 54, the transfer mechanisms 68 and 96, respectively, and the indexing quench station 98. Each of these modules performs one or more of the following functions: gripping of the workpiece 42, vertical (up/down) translation, rotation, extension and retraction of a gripping arm (to be described). Before the process controller 100 sends a command to any component of the system 40 for any operation, the process controller confirms by means of digital sensors whether the desired previous operation has indeed occurred, and insures that it is safe to perform the desired next operation. The control of the gear roll finishing machine 110 involves the coordinated operation of the servo-controlled actuators for the through-feed of the workpiece and the in-feed of the two rolling gear dies, the drive from the prime movers to the rolling dies, and the operation of the workpiece holding chuck on the through-feed spindle 70. The control of the induction heating system 112 for the contour gear tooth surfaces austenitization process involves the operation of the servo-controlled drives of the spin/scan station 52, and the energizing/deenergizing of the MF/RF power at induction coils 60, 62 supplied in a programmed sequence. The power supplies have built-in dedicated power levels and on-time controllers for precise monitoring and control of the induction heating process. Finally, the controller 100 communicates with the ancillary equipment 114 for proper operation, again by means of the software driven process control architecture previously mentioned.

Figure 7:
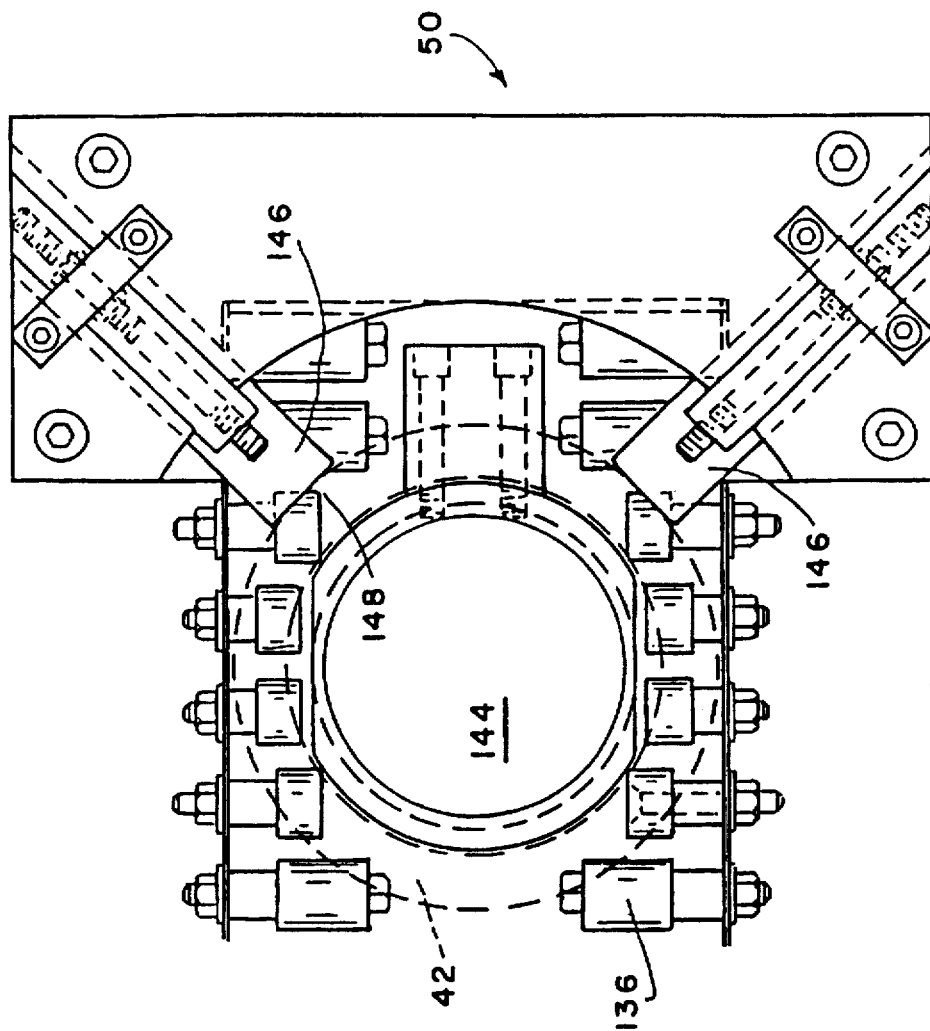
FIG. 7 is a detail top plan view illustrating a part of the apparatus illustrated in FIG. 5.
Figure 6:
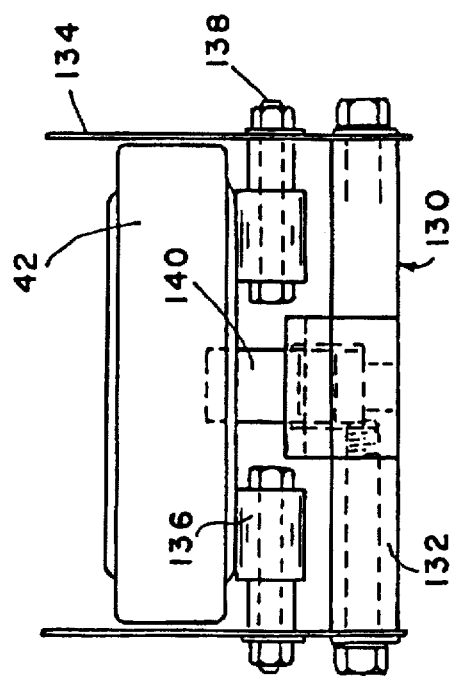
FIG. 6 is a cross-section view taken generally along line 6—6 in FIG. 5.

With particular reference now to FIGS. 5–7, it is seen that a plurality of workpieces 42 are advanced toward the system 40 (FIG. 1) by means of the in-chute mechanism 48. The in-chute mechanism 48 comprises an elongated magazine 130 (FIGS. 5 and 6) which comprises a base 132 and spaced apart upstanding sidewalls 134 integral with and upstanding from the base 132. The workpieces 42 are supported on a plurality of longitudinally spaced rollers 136 which are rotatably supported on studs 138 which are fixed to the sidewalls 134 and extend transversely of the width of the magazine 130.

A stop mechanism is employed for selectively preventing the advance of the workpieces 42 on the rollers 136. The stop mechanism comprises a plurality of pawls 140 positioned at longitudinally spaced locations along the magazine 134 having a pitch such that a workpiece 42 can be positioned between immediately successive pawls. Each pawl 140 is pivotally mounted on an axle 142 extending transversely of the sidewalls 134 and mounted thereto. When it is desired to advance the next workpiece 42 into position on the gear loader 50, all of pawls 140, in unison, may be pivoted on their associated axles 142 to a release position to allow forward movement of the workpieces on the rollers 136. When the foremost workpiece 42 becomes positioned on a platform 144 of the gear loader 50, as seen in FIG. 5A, the pawls 140 then return to their stop positions as indicated in FIG. 5.

As seen in FIG. 7, a pair of barrier members 146 are mounted on the gear loader 50 in mutually angularly disposed relationship and surfaces 148 which are engageable by each workpiece 42 as it proceeds onto the platform 144. A centering member 150 is integral with the platform 144 and, having a bevelled upper surface, is of a size slightly smaller in diameter than an inner cylindrical surface 152 of the workpiece. In this manner, the workpiece 42 is properly positioned on the platform 144. An actuator 154 is then effective to raise the platform 144 with the workpiece 142 thereon from a lowered solid line position to a raised dashed line position as seen in FIG. 5.

Figure 8:
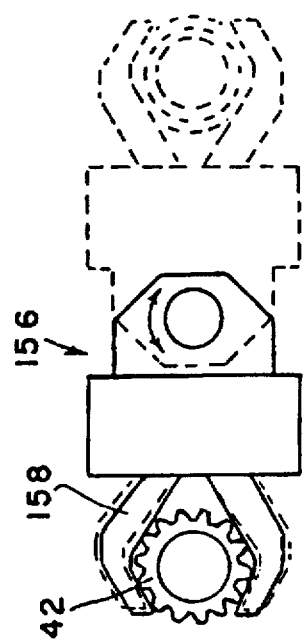
FIG. 8 is a detail top plan view of a component illustrated in FIG. 1 and depicting two positions thereof.

When the platform 144 is raised to the dashed line position, as illustrated in FIG. 5, the workpiece 42 assumes the same elevation of that of a transfer arm 156 of the swivel robot 54 (FIGS. 1 and 8). As seen in those figures, the transfer arm 156 can pivot through at least 180°. That is, it can move from a solid line position such that workpiece engaging finger members 158 (FIG. 8) are generally aligned with the platform 144 of the gear loader 50 to a dashed line position generally aligned with associated components of the heating station 52. As seen in FIG. 8, the finger members 158 of the transfer arm 156 are relatively moveable between open, dashed line, positions and closed, solid line positions engaging the outer peripheral surface of the workpiece 42. Hence, when the actuator 154 raises the platform 144 with the workpiece 42 positioned thereon to an elevated position generally coplanar with the transfer arm 156, the finger members 158 which may be pneumatically operated, for example, are moved from a withdrawn position to a gripping position to firmly hold the workpiece 42. The transfer arm 156 is then swung from the solid line, or pick-up, position to a delivery or dashed line position generally aligned with the induction coils 60, 62 at the heating station 52. It will be appreciated that as the transfer arm 156 is swung from the gear loader 50 to the heating station 52, it passes through an opening 160 in a wall of the enclosure 99. The opening 160 is of a suitable construction to allow passage of the transfer arm 156 while retaining the inert environment provided by the enclosure.

When the transfer arm 156 is moved to the dashed line position illustrated in FIG. 1, the upper actuator mechanism 58 is operable to withdraw the support spindle 56 to an initial fully retracted position as indicated by solid lines. As seen in FIG. 9, a terminal end 162 of the support spindle 56 has an expansible chuck 164 which may, for example, be pneumatically operated. With this construction, the chuck 164 can retract to gain entry into the inner cylindrical surface 152 of the workpiece 42, then be caused to expand into engagement therewith. Thus, when a transfer arm 156 has been moved to the dashed line position indicated in FIG. 1, the upper actuator mechanism 58 can be operated to advance the support spindle 56 until the expansible chuck 164 is positioned so as to be generally coextensive with the inner cylindrical surface 152 of the workpiece 42. The chuck 164 is then expanded so as to engage the inner cylindrical surface 152 and the finger members 158 of the transfer arm 156 are caused to release their engagement with the outer peripheral surfaces of the workpiece. Again, the support spindle 56 is caused to be raised and, with it, the workpiece 42. With the workpiece now out of alignment with the transfer arm 156, the latter is returned to its solid line position (FIG. 1) and in position to receive a subsequent workpiece at the gear loader 50.

The upper actuator mechanism 58 includes a linear actuator 166 (FIG. 10) which operates a plurality of lead screws 168 having upper and lower limits. A rotary actuator 170 includes integral follower nuts 172 threadedly engaged with the lead screws 168. With rotation of the lead screws 168 in a first direction, the rotary actuator 170 and its associated support spindle 56 are raised while rotation of lead screws 168 in a second, opposite, direction causes lowering of the support spindle 56.

Induction coils 60 and 62 are suitably mounted on the frame 74 in a manner not illustrated. Viewing FIG. 1, the induction coil 60 defines a first heating zone 174 and the induction coil 162 defines a second heating zone 176. A suitable source of electrical energy serves to energize the first induction heater at a medium frequency (MF) in the range of 2–20 Khz which is effective to impart adequate heat to the first heating zone 174 to thereby heat the workpiece 42 to a predetermined surface temperature and to a predetermined thermal gradient through the carburized case of the workpiece. Thus, the heat provided by the induction coil 60 is such as to heat the carburized case of the workpiece to a desired surface temperature and the sub case regions to a desired thermal gradient therethrough. The source for energizing the induction coil 62 and thereby heating the second heating zone 176 is operable at a radio frequency (RF) in the range of 100–450 Khz which is effective to impart adequate heat to the second heating zone 176 to thereby heat the carburized case of the workpiece 42 above its critical temperature to maintain the austenitic structure in the carburized case of the workpiece. In this instance, the frequency used is effective to austenitize the carburized case.

The upper actuator mechanism 58 is thus selectively operable to move the support spindle 56 from a fully withdrawn position within the rotary actuator 170 to a first position capable of receiving a workpiece 42 from the transfer arm 156 then to a second advanced position aligned within the first heating zone 174, and then to a third advanced position aligned within the second heating zone 176.

When the workpiece 42 supported on the support spindle 56 is positioned within the first heating zone 174, a rotary actuator mechanism within the housing 170 is operated to rotate the support spindle 56 on its longitudinal axis and, thereby the workpiece 42. The induction coil 60 is simultaneously energized by an electrical source which is provided at a frequency effective, as mentioned above, to impart adequate heat to the heating zone 174 to thereby heat the workpiece to a predetermined surface temperature and to a predetermined thermal gradient through the carburized case of the workpiece. After a predetermined time, the rotary actuator mechanism operates to stop rotation of the support spindle 56 and the linear actuator 166 is operated to advance the workpiece 42 to a second heating zone 176 within the induction coil 62. Again, the rotary actuator mechanism is effective to rotate the support spindle 56 on its longitudinal axis and, thereby, the workpiece 42 at a predetermined rotational speed. As in the instance of the induction coil 60, the induction coil 62 is then energized at a frequency effective to impart adequate heat to the second heating zone 176 to thereby heat the carburized case of the workpiece 42 above its critical temperature to maintain the austenitic structure throughout its carburized case.

As heating proceeds within each of the induction coils 60, 62, the temperature of the workpiece is monitored by means of an associated IR detector, 178, 180 respectively (FIG. 1). Temperature information is provided continuously to the process controller 100 which is equipped with software driven algorithms to monitor and control the lengths of the respective heating cycles. To this end, heat radiation from the peripheral surface of the workpiece is received through a radially directed sighting bore 182 formed in each coil and in a sighting member 184 attached to each coil and extending radially therebeyond. Thus, as to each induction coil 60, 62, the associated IR detector 180, 182 is able to view meaningful regions of the outer peripheral surface of the workpiece along a line of sight extending through its associated induction coil and generally in a plane of the axis of the coil and the workpiece when it is properly positioned for heating.

Upon the inclusion of operations at the heating station 52 as just described, the linear actuator 166 (FIG. 10) then rapidly advances the support spindle 56 and the workpiece 42 it is holding beyond the coils 60, 62 and into the quench media 64 contained within the processing tank or vessel 66. The quench media 64 may be a commercially available marquenching oil which is thermally controlled to maintain the workpiece at a uniform metastable austenitic temperature just above the martensitic transformation temperature. The workpiece 42 remains submerged in the quench media 64 for the duration of all net shaped forming operations, as will be described.

With particular reference now to FIGS. 13, 14, and 15, the gear transfer mechanism 68 is powered by a linear actuator 190 which is suitably mounted on the main frame 74 which serves to extend and retract an actuator rod 192 which is generally vertically disposed. A pair of spaced, parallel, guide bars 194 are also suitably fixed on the main frame 74 and are generally vertically disposed. A yoke 196 is vertically movable on the guide bars 194 by reason of journal bearings 198 and such movement is effected by the actuator rod 192 operating through a drive plate 200 representing a fixed connection between the actuator rod 192 and the yoke 196. A transfer arm 202 is fixed to a lower extremity of a support shaft 204 which, in turn, is suspended from the yoke 196. By means of the linear actuator 190 operating through the actuator rod 192 at the yoke 196, the transfer arm 202 is vertically movable between a raised, dashed line, position indicated in FIG. 15 and a lowered, solid line, position indicated in the same figure. In FIG. 1, the transfer arm 202 is diagrammatically depicted by solid lines to indicate a raised position and by dashed lines to indicate a lowered position.

In the raised position, as best seen in phantom in FIG. 14, the transfer arm 202 is positioned to receive a workpiece 42 from the support spindle 56 immediately after the workpiece has been deposited in the quench media 64 from the heating system 112.

Transfer arm 202 is similar in construction and operation to transfer arm 156. Thus, when the support spindle 56 is in its fully extended condition holding the workpiece 42 submerged in the quench media 64 just beneath an upper surface 206 thereof (FIGS. 1 and 10), the linear actuator 190 is operated so as to raise the transfer arm 202 to the level of the workpiece while holding opposed jaws 208 in an open position generally encircling the workpiece 42 but not engaging it. Thereupon, as seen particularly well in FIGS. 13A and 13B, a jaw actuator 210 is operable in a suitable manner to move an upper jaw rack 212 between a fixed stop 214 and an adjustable stop 216. A first upper pinion 218 on a vertical adjustment shaft 220 is in meshing engagement with the rack 212 and, further, with a second upper pinion 222 fixed on another adjustment shaft 224 whose longitudinal axis is substantially parallel to that of shaft 220.

As seen especially well in FIG. 13B, a pair of lower pinions 226, 228 are fixed to the lower ends, respectively, of the adjustment shafts 216, 220. The pinions 226, 228 are mutually engaged and the former is enmeshed with a lower jaw rack 230 while the latter is enmeshed with a lower jaw rack 232.

At locations distant from the support arm 202, the racks 230, 232 are pivotally attached to the jaws 208. Furthermore, all of the components illustrated in FIG. 13B are so supported on an extension 234 (FIGS. 13 and 15A) of the support shaft 204 that movement of the upper jaw rack 212 in one direction will cause opening of the jaws 208, that is, movement to the dashed line position illustrated in FIG. 14 and movement of the upper jaw rack 212 in an opposite direction will cause closure of the jaws into firm engagement with the workpiece 42.

When the jaws 208 are firmly engaged with the workpiece as it is being held by the chuck 164 just beneath the upper surface 206 of the quench media 64, the chuck 164 is deflated and the support spindle 156 withdraws the chuck by elevating it away from the region of the workpiece.

Thereupon, the linear actuator 190, viewing FIG. 13, operates to cause the yoke 196 to descend from a raised, dashed line position to a lowered solid line position.

When the yoke 196 is in the lowered solid line position depicted in FIG. 13, the transfer arm 202 lies generally in a plane for the reception of the workpiece by the through-feed spindle 70. However, in order for that to occur, viewing FIG. 14, the transfer arm 202 must be moved from the dashed line position to the solid line position. In order to accomplish this operation, a pivot actuator 236 mounted on the yoke 196 serves to move a pivot rack 238 to and fro along its longitudinal axis. A pivot pinion 240, fixed to the transfer arm 202 at its inboard end, is in meshing engagement with the pivot rack 238. With this construction, longitudinal movements of the pivot rack 238 effected by the pivot actuator 236 serve to swing the transfer arm 202, viewing FIG. 14, from the dashed line position aligned with the heating system 112 to the solid line position aligned with the gear roll finishing machine 110 and, specifically, with the through-feed spindle 70.

The through-feed spindle 70 is of a construction similar to spindle 56 in that it has an expansible chuck which is engageable with the inner cylindrical surface 152 of a workpiece 42. Thus, when the jaws 208 of the transfer arm 202 have moved to a position such that the workpiece 42 overlies the through-feed spindle 70, operation of the through-feed actuator 72 causes elevation of the spindle 70 and its associated chuck until the chuck enters and engages the workpiece. Thereupon, the jaws 208 are opened, the actuator 72 is operated to temporarily lowered the workpiece out of the plane of the transfer arm 202, and the latter is swung once again, under operation of the pivot actuator 236 back to the dashed line position of FIG. 14. The through-feed actuator then operates to elevate the workpiece 42 into a generally coextensive or coplanar relationship with the rolling gear dies 44, 46 as indicated in FIGS. 1–3, 10, and 16.

The gear roll finishing machine 110 includes a pair of opposed in-feed assemblies 78, 80 which are substantially similar in construction but positioned on diametrically opposite sides of the workpiece 42 when the latter is in the rolling position as illustrated in FIG. 16. Each in-feed assembly 78, 80 includes a rolling gear die housing 82 for rotatably supporting on a drive shaft 246 a rolling gear die, 44, 46, respectively, each of which has an outer peripheral profiled surface for rolling the gear teeth surfaces of the workpiece 42 to a desired outer peripheral profiled shape. Of course, as previously noted, this is achieved while holding the temperature of the workpiece in a uniform metastable austenitic temperature range. It was also previously mentioned that the workpiece 42 has previously been formed as a near net shaped gear blank with oversized gear teeth. During the operations about to be described, the excess tooth thickness is removed and the proper, or desired, tooth profile achieved.

Figure 17B:
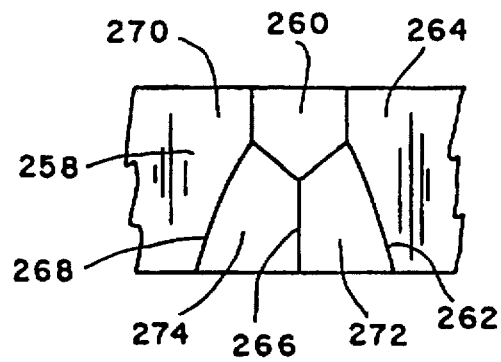
FIG. 17B is a detail top plan view of the gear tooth illustrated in FIG. 17.
Figure 17:
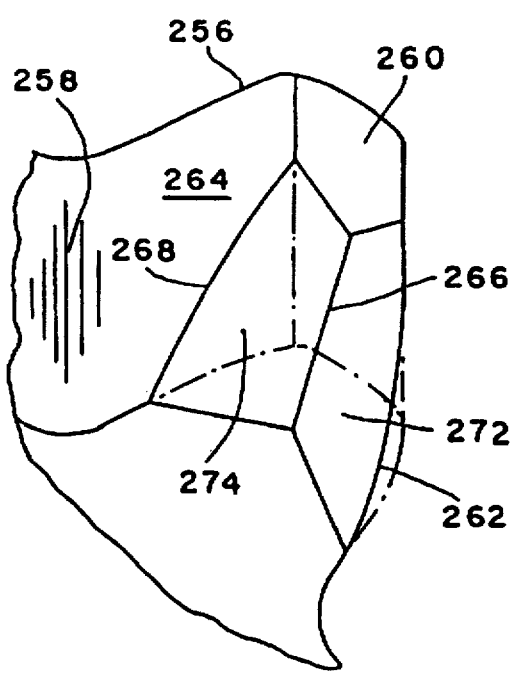
FIG. 17 is a detail perspective view of an individual tooth of an indexing gear utilized for purposes of the invention.
Figure 17A:
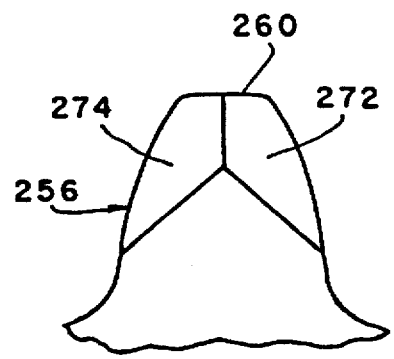
FIG. 17A is a detail side elevation view of the gear tooth illustrated in FIG. 17.
Figure 18:
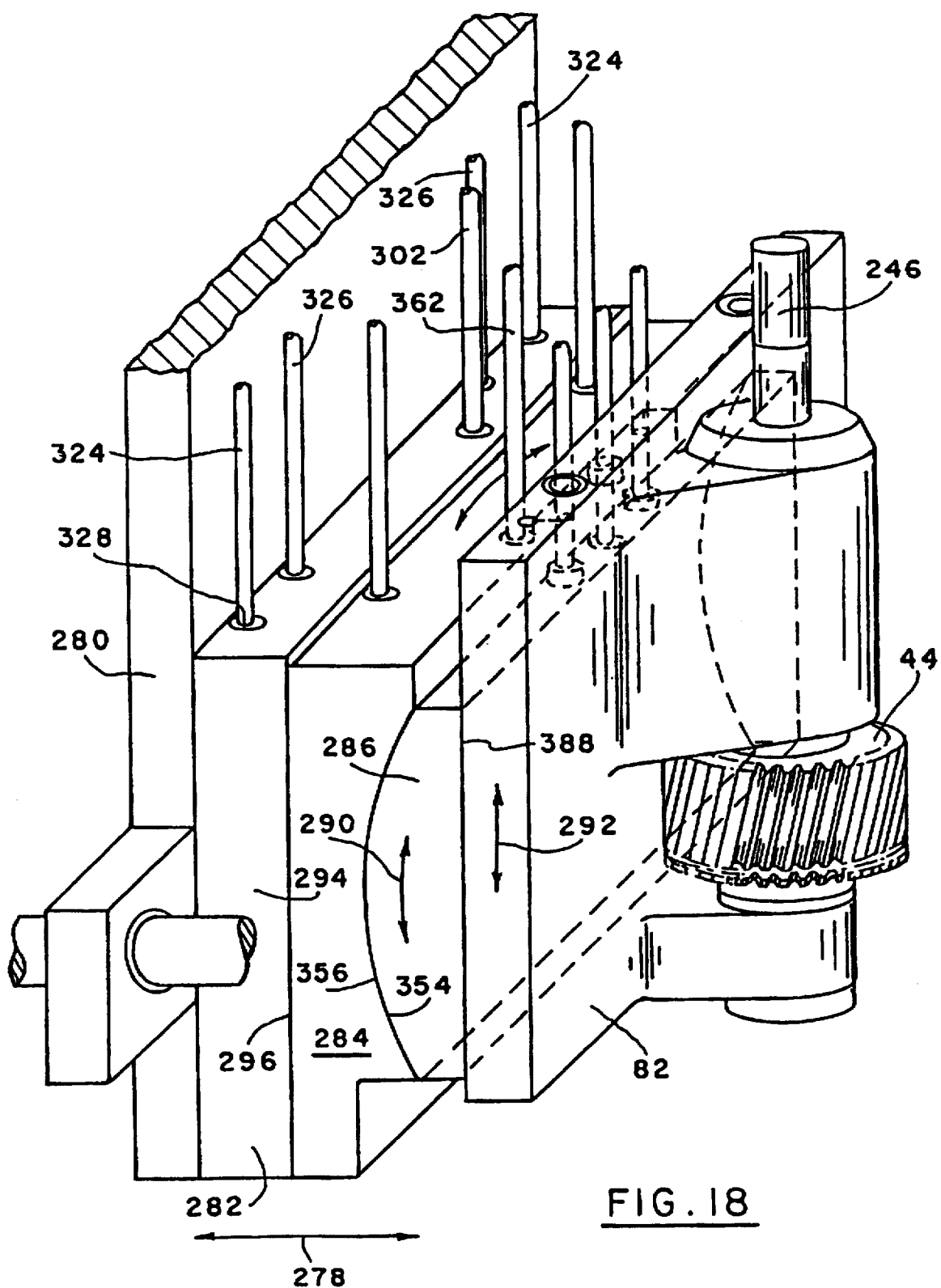
FIG. 18 is a detail perspective diagramatic view illustrating one set of adjustment mechanisms for an in-feed assembly of the apparatus of the invention.
Figure 19:
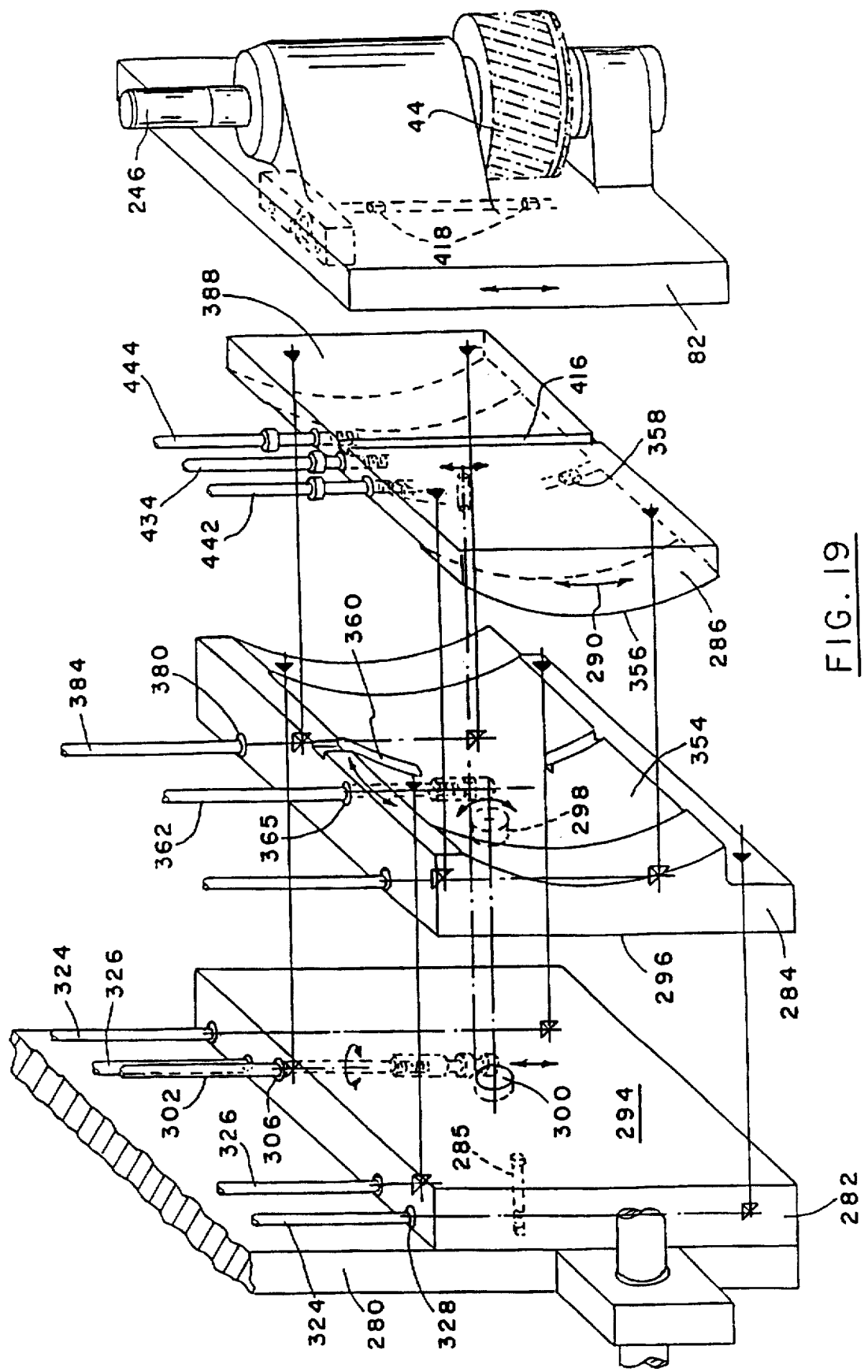
FIG. 19 is a perspective exploded view of the adjustment mechanisms illustrated in FIG. 18.
Figure 20:
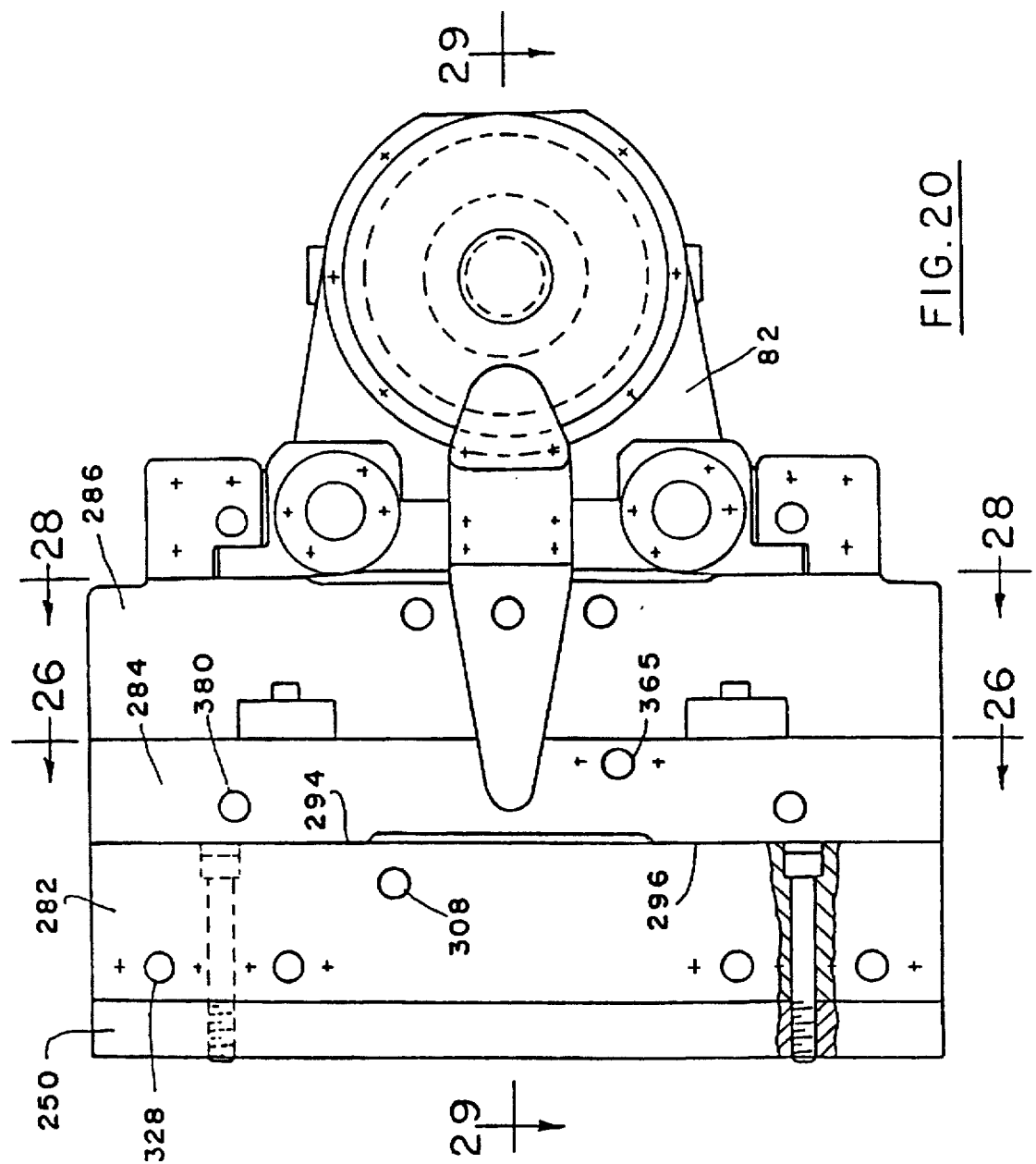
FIG. 20 is a top plan view of the adjustment mechanisms illustrated in FIG. 18.

A rotary drive actuator 248 (see FIGS. 2 and 3) operates the drive shafts 246 for both of the rolling gear dies 44, 46 in a synchronous manner through a coupling transmission 250, connecting shafts 252, and constant velocity joints 76. It will be appreciated that the longitudinal axes of the through-feed spindle 70 and the axes of rolling gear dies 44, 46 are nominally parallel. However, this relationship may be altered by reason of the adjustment mechanisms 84 in order to achieve a properly profiled gear from the workpiece 42. These adjustment mechanisms 84 will be described in detail below. As the through-feed spindle 70 is elevated by the through-feed actuator 72 into operating position, it is necessary to synchronize or coordinate the rotation of the workpiece 42 with that of the rolling gear dies 44, 46. Such synchronization may be achieved by means of an indexing gear 254 supported for rotation on the drive shaft 246 adjacent the rolling gear die 44. To this end, viewing FIGS. 17, 17A, and 17B, the indexing gear 254 may be a spur of helical gear having a modified teeth 256. In FIG. 17, the outline of an original tooth is indicated by a combination of solid and dashed lines. As modified, indicated solely by solid lines, each tooth extends from a root 258 to a top land 260 and has been tapered on its lead side in a manner extending from a line of departure 262 from a flank 264 across a crest 266 to an opposite line of departure 268 from an opposite flank 270. This construction results in opposed tapered surfaces 272, 274 on the entry side of the teeth 256 which operate as cams to slightly rotate the workpiece 42 into synchronization with the rolling gear dies 44, 46. Since the rolling gear dies 44, 46 are already rotatingly synchronized by reason of the coupling transmission 250, only a single indexing gear 254 is required and, in the construction illustrated, it has arbitrarily been placed on the drive shaft associated with the rolling gear die 44. However, it is within the scope of the invention, if desired, to position the indexing gear 254 instead adjacent the rolling gear die 246. While other mechanisms could be used to move the workpiece 242 into alignment with the rolling gear dies 44, 46 prior to their placement into a meshing relationship, the construction disclosed is a most economical one and is preferred.

It was earlier mentioned that the degree of deformation of the-tooth surfaces of the workpiece 42 must be controlled to very close tolerances by precise monitoring and control of the movements of each of the two rolling gear dies 44, 46 with respect to the workpiece 42. It was further mentioned that the workpiece axis as well as the axes of the two rolling gear dies must be precisely aligned to achieve the high lead and profile accuracy specified for ultra-high precision gears. The adjustment mechanisms 84 which have been broadly mentioned previously provide the adjustments for the rolling gear dies 44, 46 which are necessary to achieve the high dimensional accuracy being sought.

It was earlier mentioned that the spindle 70 carrying the workpiece 42 is elevated, that is, moved in a through-feed direction, into an operating position which is generally coextensive with the opposed rolling gear dies 44, 46. With the aid of the indexing gear 254, or other appropriate mechanism, the workpiece is caused to meshingly engage the rolling gear dies. Thereafter, the rolling gear dies 44 and 46 are each simultaneously advanced in an in-feed direction within a common plane which generally contains the axes of the spindle 70 and of both drive shafts 246. The rolling gear dies 44, 46 advance, respectively, in opposite in-feed directions which are substantially perpendicular to the axis of the workpiece at diametrically opposed locations and at near net shaped center distances which establish initial center distances between the longitudinal axis of each drive shaft 246 and of the spindle 70. The assemblies 242, 244 continue to advance their associated rolling gear dies 44, 46, respectively, in the in-feed direction each by an additional increment of center distance thereby deforming the profile services of each gear tooth of the workpiece 42 and thereby resulting in final net shape of the gear teeth.

At the conclusion of an initial forming operation on a workpiece 42, the resulting net shaped gear is dimensionally studied. It is common practice for it to be determined as a result of that dimensional analysis that changes are to be made to the profile of the tooth surfaces before a finally acceptable gear is achieved. It is for this reason that adjustments are made to the relative positioning between the rolling gear dies 44, 46 and the workpiece 42.

The individual components for each of the in-feed assemblies 78, 80 are substantially similar. Therefore, the description will be substantially limited to in-feed assembly 78, but it will be understood that such description also pertains to in-feed assembly 80, unless otherwise noted. A trolley 276 (FIGS. 2 and 3) is laterally movable on the bearing elements 85 as generally indicated by double arrowhead 278. In turn, an in-feed assembly frame 280 is fixed to the trolley 276 and depends therefrom. A support block 282 is mounted on the in-feed assembly frame 280, then a helical adjustment plate 284 is mounted on the support block 282, then a parallel adjustment plate 286 is mounted on the plate 284. Finally, the bifurcated rolling gear die housing 82 is mounted on the adjustment plate 286. The mounting construction between each successive pair of the components is different so as to provide for a different type of movement of the rolling gear die 44 with respect to the workpiece 42. More specifically, viewing FIG. 16, the helical adjustment plate 284 is movable relative to the assembly frame 280 (and support block 282) in a manner indicated by arcuate double arrowhead 288. Movement of this nature is effective to adjust the rolling gear die 44 out of a common plane nominally defined by the axes of the drive shafts 246 and of the through-feed spindle 70. Support block 282 is suitably fixed to the in-feed assembly frame 280 as by fasteners 285.

In a similar fashion, a parallel adjustment plate 286 is mounted on the helical adjustment plate 284 for relative motion as generally indicated by an arcuate double arrowhead 290. Adjustment of the rolling gear die 44 is thereby achieved within a common plane containing the longitudinal axes of the drive shaft 246 and of the through-feed spindle 70.

Finally, the rolling gear die housing 82 is movable relative to the parallel adjustment plate 286 in directions represented by a double arrowhead 292, by reason of which the rolling gear die 44 is movable along its own axis of rotation relative to the workpiece 42.

The structure enabling these various motions of the rolling gear die 44 relative to the workpiece 42 will now be described in greater detail.

Turn now to FIGS. 16 and 18–22 for a description of the helical adjustment and locking mechanism. It was previously mentioned that support block 282 is mounted on the in-feed assembly frame 280 and is substantially fixed against movement in directions parallel to the axis of rotation of the rolling gear die 44. The support block 282 has a substantially planar block surface 294 (see especially FIG. 19) which generally faces the rolling gear die housing 82. For its part, the helical adjustment plate 284 has a substantially planar pivot surface 296 which is generally coextensive and slidably engaged with the planar block surface 294.

A centrally located pivot spindle 298 which is integral with the helical adjustment plate 284 and projects from the pivot surface 296 is slidably received in a mating pivot bore 300 which is recessed from the block surface 294. In this manner, the support block 282 and the helical adjustment plate 284 are interconnected for defined pivotal movement of the pivot surface 296 on the planar block surface 294 about an out-of-plane axis, thereby allowing the adjustment of the axis of the rolling die 44 in a vertical plane which is perpendicular to the plane containing the rolling dies 44, 46 and the workpiece 42.

A helical adjustment rod 302 interconnects the support block 282 and the helical adjustment plate 286 and is operable for selectively moving the helical adjustment plate on the support block. The support block is formed with a central cavity 304 (FIG. 22) which is offset from a geometric center thereof as defined by the pivot bore 300. A through bore 306 extends between an outer surface 308 of the support block and the central cavity 304 and serves to rotatably receive the adjustment rod 302.

The helical adjustment plate 284 is formed with a transverse through bore 310 (FIG. 22) which communicates with the central cavity 304 in the support block 282. An adjustment pin 312 is fittingly received in the through bore 310 and projects into the central cavity 304 where it is matingly engaged with a dowel member 314. More specifically, the adjustment pin 312 is fittingly engaged with a transverse bore 316 formed in the dowel member 314. The upper end of the dowel member 314 is threaded as at 318 and is threadedly engaged with a tapped bore 320 formed in a lower end of the helical adjustment rod 302.

By means of this construction, rotation of the helical adjustment rod 302 in either direction as indicated by a circular double arrowhead 322 is effective to rotate the helical adjustment plate 284 and, eventually, the rolling gear die 44 thereon about an axis whose center is defined by the pivot spindle 298 and lies in a plane defined by the axes of a rolling gear die 44 and of the workpiece 42.

Once the helical adjustment plate 284 has been moved to a desired position relative to the support block 282, upon operation of the helical adjustment rod 302, two pairs of helical locking rods 324, 326, are operated to secure the helical adjustment plate in its selected orientation. Each of the locking rods 324, 326 is rotatably journaled in an associated throughbore 328 in the support block 282 and in other associated journal bearing blocks 330 integral with the support block 282 and projecting into a central cavity 332 of the support block at spaced locations. It can be seen that the locking rods 324 are longer than the locking rods 326, the former being associated with locking nuts 334 (FIG. 23) and the latter being associated with locking nuts 336 (FIG. 23A). The support block 282 is formed with four substantially parallel spaced locking bores 338 adjacent the corners thereof. The locking bores 338 are perpendicular to the axis defined by the through bore 328 and journal bearing blocks 330 and are aligned with a like number of associated locking bores 340 formed in the helical adjustment plate 284. The locking bores 340 extend through locking ledges 342 which are a part of the helical adjustment plate 284 and, specifically, between the pivot surface 296 and a locking ledge surface 344. Bevel gears 346 are fixed to the extremities of the locking rods 324, 326 and are meshingly engaged with bevel gears 348 fixed to one end of the stud members 350 whose other end is threadedly engaged with one of the associated locking nuts 334.

Figure 21:
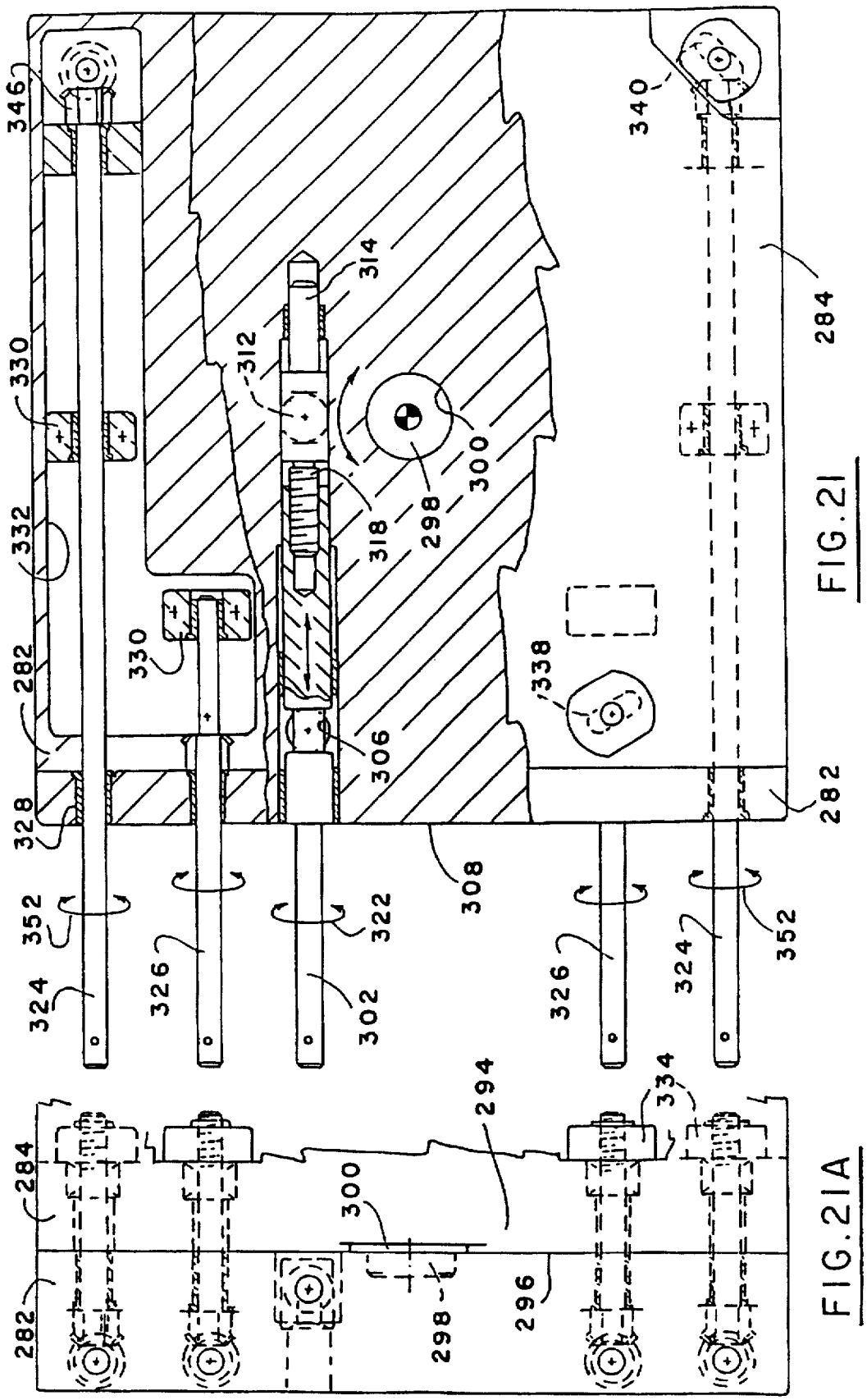
FIG. 21 is a side elevation view, certain parts being cut away and being shown in section, of a part of the adjustment mechanisms illustrated in FIG. 18.

By reason of this construction, rotation in one direction of each of the locking rods 324, 326 about its longitudinal axis as represented by circular double arrowheads 352 is effective to move the locking nuts into locking engagement with their associated locking ledge surfaces 344 and rotation in the opposite direction is effective to move the nuts out of locking engagement with the surfaces 344. As seen in FIG. 21, the locking bores 338, 340 are somewhat elongated to accommodate the pivotal movement of the helical adjustment plate 284 on the support block 282.

Consider now the mechanism for selectively adjusting the rolling gear die housing 82 and with it the rolling gear die 44 within a common plane containing the die and workpiece axes to enable the rolling gear die to assume a desired orientation relative to the workpiece. For this purpose, turn now to FIGS. 16, 18, 19, 20, and 24. As will be understood from the preceding description, the helical adjustment plate 284 is mounted on the in-feed assembly frame 280, via support block 282, and fixed against movement in the direction of the axis of the rolling gear die 44. The helical adjustment plate 284 has a concave cylindrical surface 354 which generally faces the rolling gear die housing 82. The surface 354 has a longitudinal, in-plane, horizontal axis which is generally perpendicular to the plane of the axes of the die 44 and the workpiece 42. A parallel adjustment plate 286 has a convex cylindrical surface 356 coextensive and slidably engaged with the concave cylindrical surface 354. A keyed interconnection is provided between the parallel adjustment plate and the helical adjustment plate for defined sliding movement of the convex cylindrical surface 356 on the concave cylindrical surface 354. As seen particularly well in FIGS. 19 and 24, a pair of keys 358 on the parallel adjustment plate 286 and projecting outwardly toward the helical adjustment plate 284 from the surface 356 are engaged with the arcuate grooves 360, respectively, recessed from the surface 354 in the plate 284. The grooves 360 and their mating keys 358 lie generally in a plane containing the rotational axis of the rolling gear die 44 and of the workpiece 42. An adjustment rod 362 interconnects the parallel adjustment plate 286 and the helical adjustment plate 284 and is operable for selectively moving the former relative to the latter. The helical adjustment plate 284 is provided with a central cavity 364 (FIG. 24) and a throughbore 365 extending between an outer surface 366 and the central cavity.

An adjustment pin 368 (FIG. 24) is fixed on the parallel adjustment plate 286 as by means of a force fit within a throughbore 370. The adjustment pin 368 projects from the convex cylindrical surface 356 into the central cavity 364 of the helical adjustment plate. A dowel member 372 has a transverse bore 374 which fittingly receives the end of the adjustment pin 368 projecting from the surface 356. The dowel member 372 also has a tapped bore 376 for engagement with a lowermost threaded end of the adjustment rod 362.

By reason of this construction, rotation of the adjustment rod 362 about its longitudinal axis as indicated by circular double arrowhead 378 is effective to move the parallel adjustment plate 286 relative to the helical adjustment plate 284 about the in-plane axis as previously defined.

As in the instance of the helical adjustment plate 284, a locking mechanism is provided interconnecting the parallel adjustment plate 286 and the helical adjustment plate 284 for selectively securing the parallel adjustment plate in a desired in-plane orientation. To this end, and viewing especially FIG. 25, a pair of parallel throughbores 380 extend between the outer surface 366 and the central cavity 364. Aligned with each of the throughbores 380 is a pair of pillow blocks 382 which extend into the cavity 364 and serve to rotatably receive an elongated locking rod 384.

The helical adjustment plate 284 is also formed with two pairs of substantially parallel spaced locking bores which extend between the central cavity 364 and the concave cylindrical surface 354. A parallel adjustment plate 286 has a substantially flat surface 388 opposite the convex cylindrical surface 356 and two pairs of axially aligned counterbores 390 and crossbores 392, each associated counterbore and crossbore defining an annular shoulder 394 at their intersection. The counterbores 390 are in communication with the flat surface 388 and the crossbores are in communication with the convex cylindrical surface 356 and each proximate pair of counterbores 390 and crossbores 392 are generally aligned with an associated locking bore 386. A stud member 396 having a longitudinal axis generally perpendicular to the axis of the rolling gear die 44 is rotatably received, or journaled, in each of the locking bores 386 and is threaded as at 398 on an end distant from the helical adjustment plate 284 and generally coextensive with the counterbore 390. A pair of longitudinally spaced bevel gears 100 are rotatably mounted on each of the pillow blocks 382 so as to be axially aligned with each of the locking rod receiving throughbores 380. Each of the bevel gears 400 is integral with a hollow stud shaft 402 which is internally splined. Each of the stud members 396 has a bevel gear fixed thereto at an end opposite the threaded end 398 and is meshingly engaged with an associated one of the bevel gears 400. Each of the locking rods 384 has external splines 406 at spaced locations within the central cavity 364.

A nut 408 is threadedly engaged with the threaded end 398 of each stud member 396 and is, in turn, engaged with a washer bearing 410 having a flat surface engaged with the annular shoulder 394 and a concave spherical bearing surface engaged with the convex spherical bearing surface of the nut.

Figures 22, 24, 25:
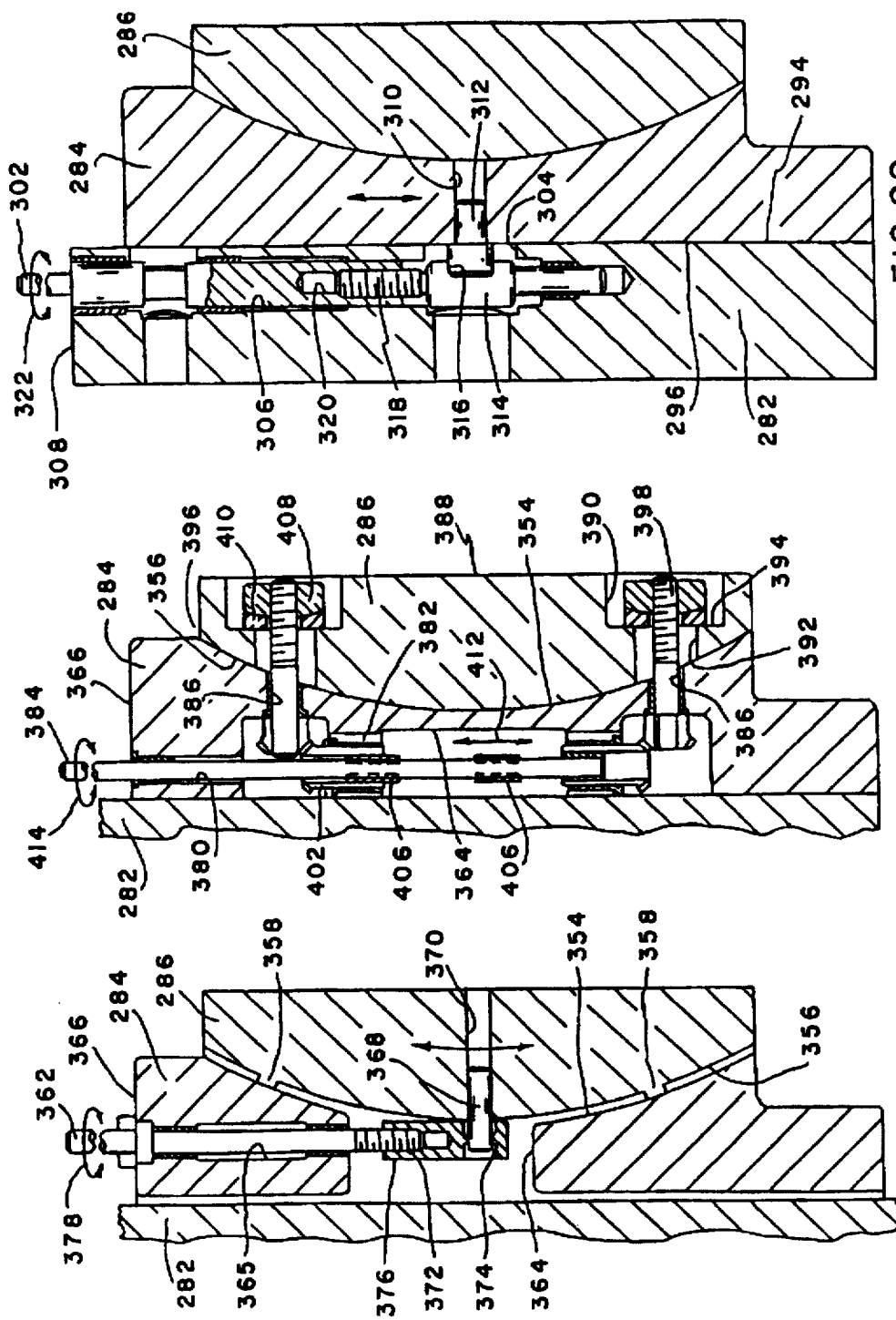
FIG. 22 is a cross-section view of one of the adjustment mechanisms illustrated in FIG. 18.
FIGS. 24 and 25 are detailed cross-section views of other adjustment mechanisms illustrated in FIG. 18.
Figure 27:
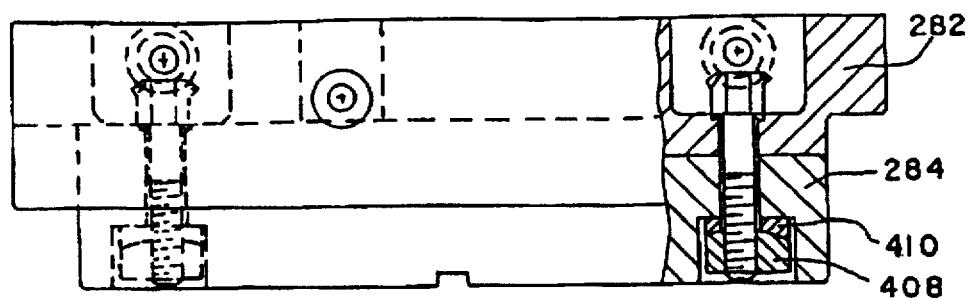
FIG. 27 is a top plan view, certain parts being cut away and shown in section, of FIG. 26.
Figure 26:
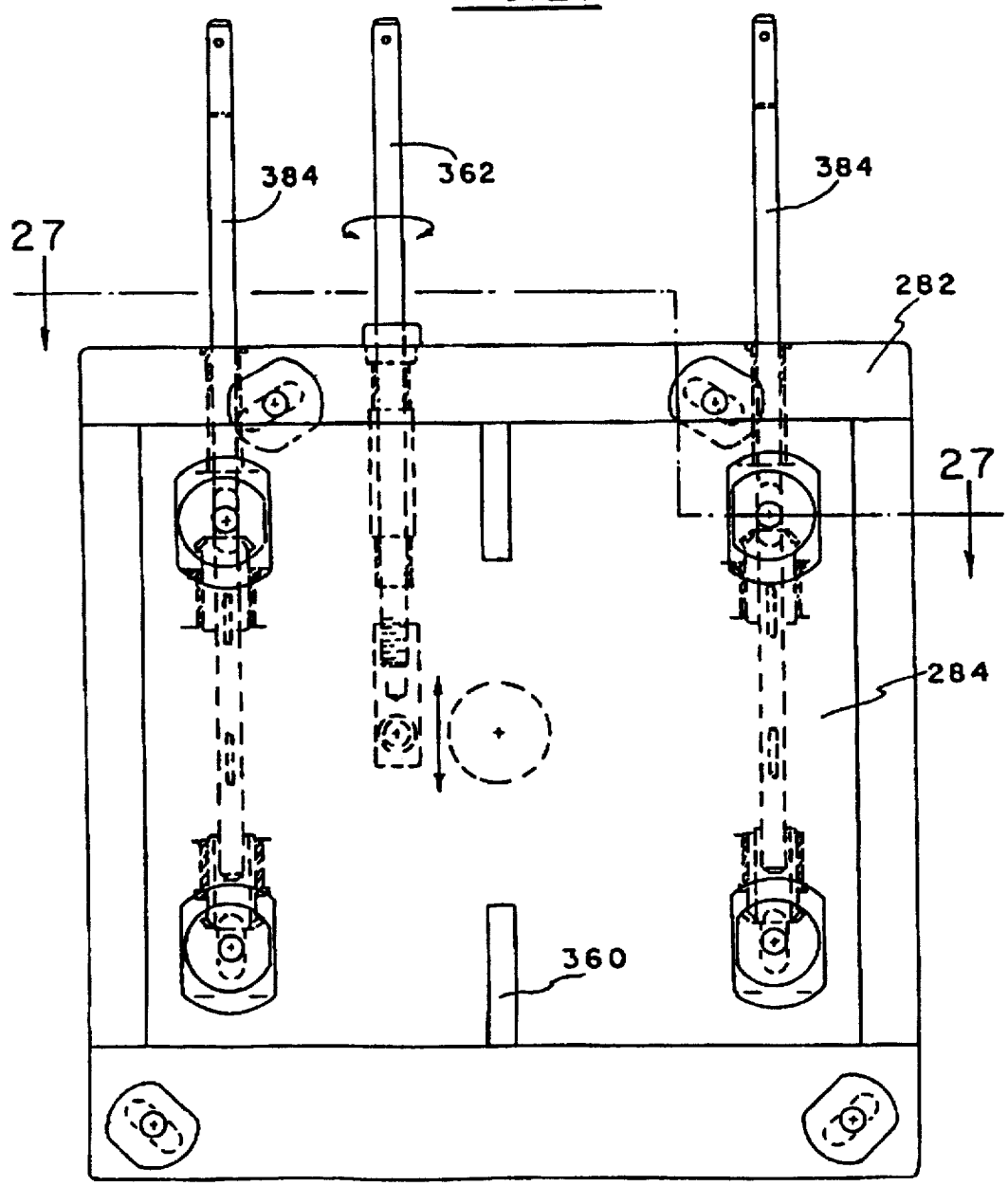
FIG. 26 is a view taken generally along the line 26—26 in FIG. 20.

The locking rod 384 is both longitudinally movable as represented by a double arrowhead 412 and is rotatable as indicated by a circular double arrowhead 414 (FIG. 25).

The nuts 408 are either tightened down or loosened, one at a time, by first moving the locking rod 384 longitudinally to position one of the externally splined regions 406 into meshing engagement with the internal splines with one of the stub shafts 402. Then, the locking rod 384 is rotated in the appropriate direction to either tighten or loosen the associated nut 408. A similar procedure is performed to either tighten or loosen each of the other nuts.

The spherical bearing surfaces between each nut 408 and its associated washer bearing 410 is provided to accommodate the relative movement between the parallel adjustment plate 286 and the helical adjustment plate 284 which results by operation of the adjustment rod 362.

The attitude adjustment mechanism of the invention also includes an axial adjustment mechanism for selectively moving the rolling gear die housing 82 along the die axis to enable the rolling gear die 44 to assume a desired orientation relative to the workpiece 42. From the preceding description, it will be apparent that the adjustment plate 286 is mounted on the in-feed assembly frame 280 via the support block 282, the helical adjustment plate 284, and the parallel adjustment plate 286 in such a manner that it is fixed against movement in the direction of the axis of the rolling gear die 44. For a detailed description of the axial adjustment mechanism, turn now primarily to FIGS. 16, 18–20, 28, and 29.

Figures 28A, 28B:
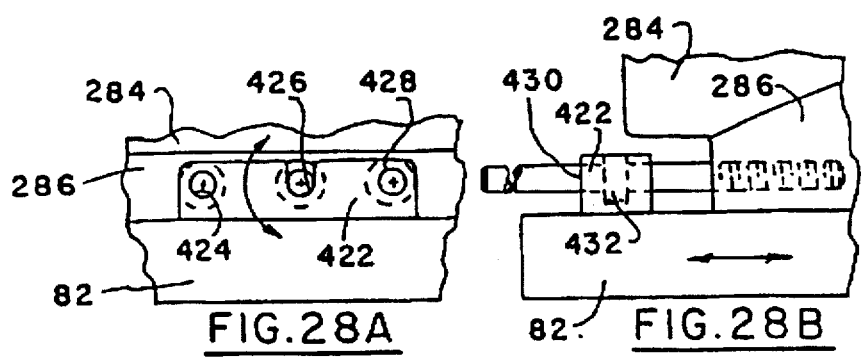
FIGS. 28A and 28B are detail top plan and side elevation views, respectively, of parts illustrated in FIG. 28.
Figure 28:
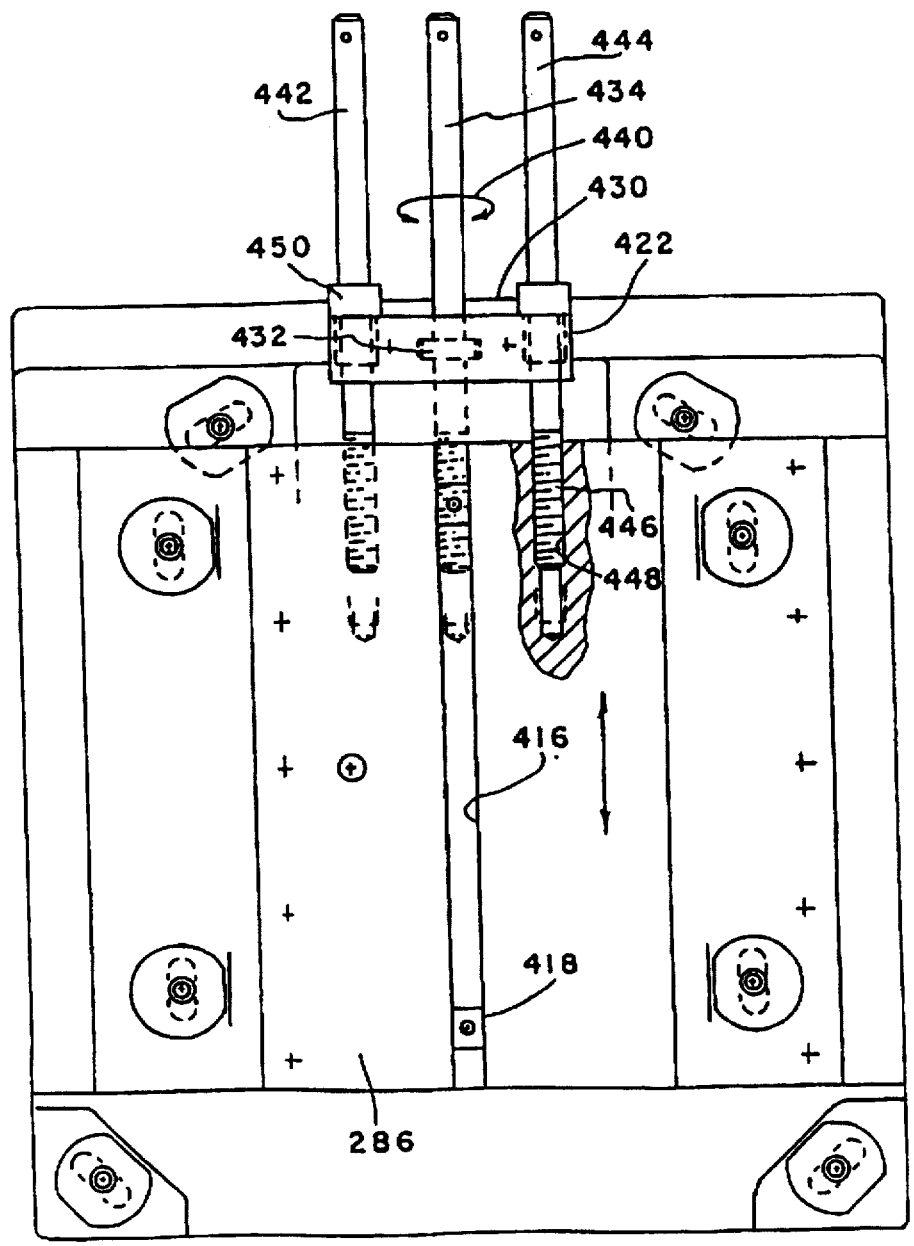
FIG. 28 is a view taken generally along line 28—28 in FIG. 20.
Figure 29:
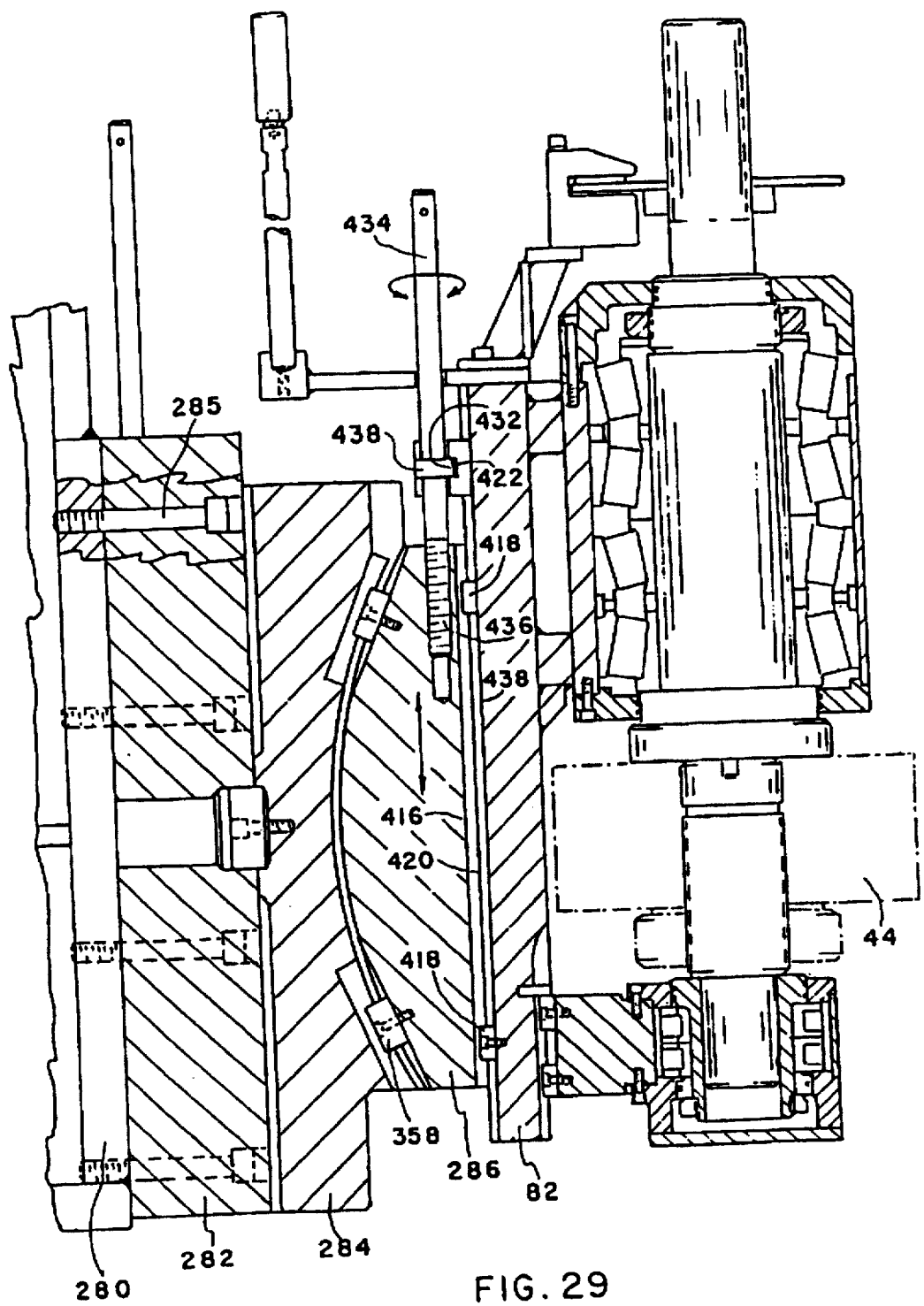
FIG. 29 is a detail cross-section view of components illustrated in FIG. 18.

A key mechanism interconnects the rolling gear die housing 82 and the parallel adjustment plate 286 to restrain relative movement between them to a direction parallel to the axis of the rolling gear die. To this end, a key slot 416 is formed in the flat surface 388 of the parallel adjustment plate 286 whose axis is parallel to that of the rolling gear die 44. Key members 418 are integral with the housing 82 and project outwardly from a planar surface 420 (FIG. 29) and are aligned with the axis of rotation of the rolling gear die 44. The key members 418 are of a size such that, with minimal clearance, they are slidable along the key slot 416. A yoke 422 is integral with the rolling gear die housing 82 and projects outwardly therefrom in a direction toward the in-feed assembly frame 280 so as to be generally coextensive with the parallel adjustment plate 286. As seen particularly well in FIGS. 28, 28A and 28B, the yoke 422 has three parallel bores 424, 426, and 428 therethrough and an engagement surface 430 lying in a plane transverse of the axes of the bores. The axes of the bores 424, 426, 428 are generally parallel with the axis of the rolling gear die 44 and the bore 426 has a coaxial annular recess 432.

An elongated adjustment rod 434 extends in a slidable manner through the bore 426 and has a threaded terminal end 436 which is threadedly engaged with a tapped bore in the upper regions of the parallel adjustment plate 286. An annular boss 438 on the adjustment rod 434 is freely received in the annular recess 432. By reason of the construction just described, rotation of the adjustment rod 434 about its longitudinal axis as depicted by a circular double arrowhead 440 is effective to raise or lower the rolling gear die housing 82 and with it the die 44 in directions parallel to the die axis.

A pair of locking rods 442, 444, similar to the adjustment rod 434, slidably extend through the bores 424, 428 respectively, in the yoke 422, also in directions generally parallel to the die axis. Each of the locking rods 442, 444 includes a threaded terminal end 446 which is threadedly engaged with an associated tapped bore 448 in the upper regions of the parallel adjustment plate 286. Each of the locking rods 442, 444 has an annular shoulder member 450 at a location spaced from the threaded terminal end 446. When the housing 82 has obtained a desired position relative to the parallel adjustment plate 286, the locking rods 442, 444 are rotated about their longitudinal axes until the shoulder members 450 engage the engagement surface 430 of the yoke 422. Such engagement serves to lock the housing 82 against further movement until such a future time at which such movement is desired. Thereupon, the locking rods 442, 444 can be rotated in the opposite directions to disengage the annular shoulder members 450 from the engagement surface 430 thereby freeing the housing 82 for desired movement relative to the parallel adjustment plate 286.

Figure 2:
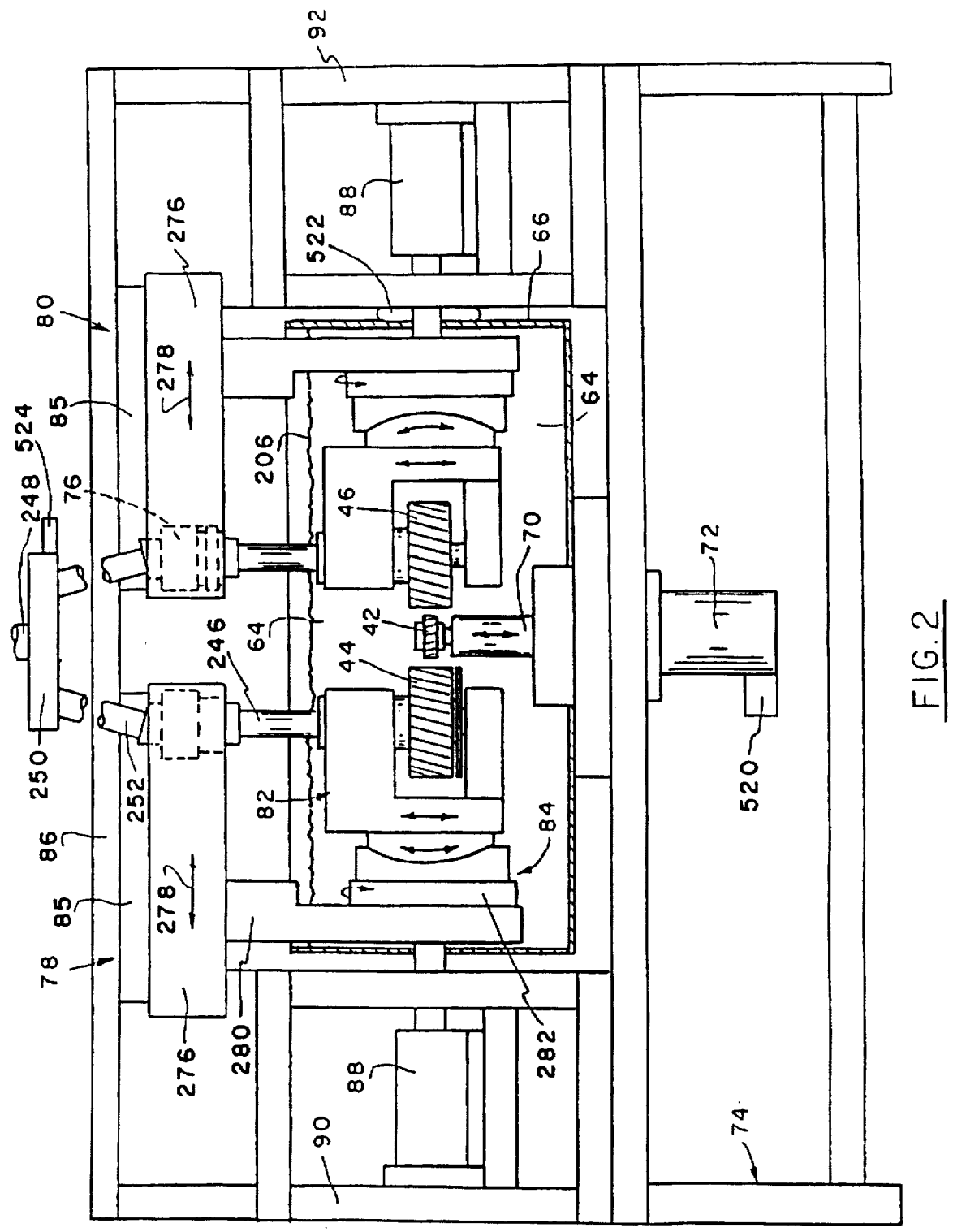
FIG. 2 is a front elevation diagramatic view illustrating a part of the system illustrated in FIG. 1.

As was previously explained, each in-feed assembly 78, 80 may be advanced into operating relationship with the workpiece 42 by a separate in-feed actuator 88. Such a construction is illustrated in FIG. 2 and requires that the controller 100 properly monitor the operation of both actuators to assure that they operate in a coordinated manner. An alternative to such a construction is illustrated in FIG. 3. In this latter instance, only one in-feed actuator 88 is utilized for operating both in-feed assemblies 78, 80. This is desirable in order to reduce the initial expense of hardware and its subsequent maintenance as well as simplifying the system. A coordinating mechanism 452 for achieving this goal will now be described.

Turning initially to FIG. 3, the single in-feed actuator 88 is mounted on a cross-frame member 454 which is an integral part of the main frame 74, for in-feed and out-of-feed movement as indicated by a double arrowhead 456. This is achieved in a substantially friction free manner as provided by a suitable bearing package 458 interposed between the actuator and the cross-frame member.

Figure 31:
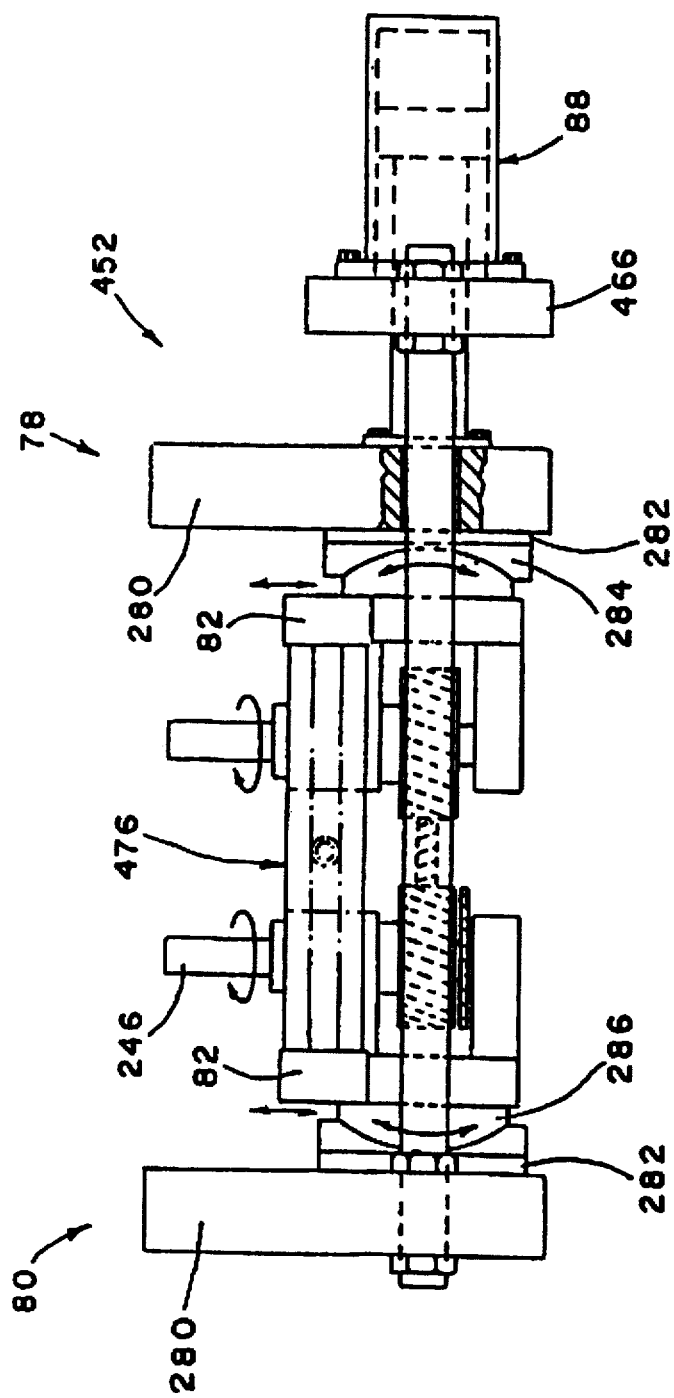
FIG. 31 is a front elevation view of the coordinating mechanism illustrated in FIGS. 30 and 30A.
Figure 32:
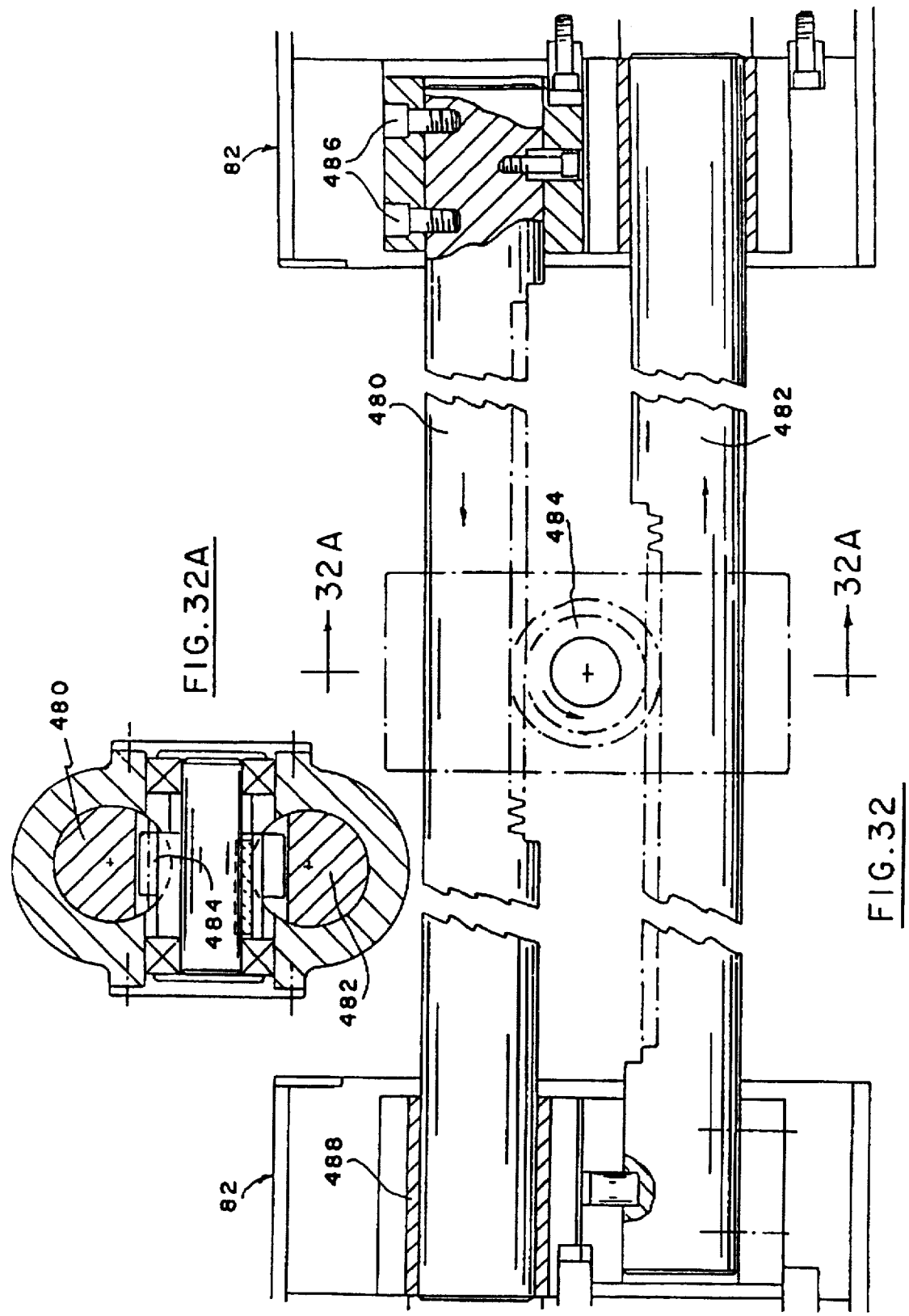
FIG. 32 is a detail side elevation view, certain parts being cut away and shown in section for clarity, of a part of the coordinating mechanism illustrating in FIGS. 30, 30A, and 31.

As more clearly seen in FIGS. 30 and 31, which diagramatically depict the construction and operation of the coordinating mechanism 452, the actuator 88 includes a cylinder 460, a piston 462 and an actuator rod 464 which extends slidably through a actuator plate 466 to which the cylinder 460 is mounted. The actuator rod 464 also extends, slidably through the sidewall of the processing tank 66, but sealingly in a manner which insures the integrity of the processing tank. An end of the actuator rod 464 distant from the piston 462 is mounted as by bolts 468 to the in-feed assembly frame 280 associated with in-feed assembly 80.

A pair of elongated, spaced apart, parallel, synchronizing rods are mounted, as by nuts 472 to the in-feed assembly frame 280 of the in-feed assembly 78. Their opposite ends are similarly mounted as by nuts 474 to the support number 466. The in-feed assembly frame 280 associated with the in-feed assembly 80 is slidably mounted on the synchronizing rods 470. Specifically, the rods 470 extend in a slidable manner through bores 476 formed therein. Upon operation of the in-feed actuator 88, whereby a piston 462 moves from the position indicated in FIG. 30 to that indicated in FIG. 30A, the actuator rod 464 moves likewise to the left and carries with it frame 280 of in-feed assembly 80. Simultaneously, and in reaction thereto, the actuator plate 466 moves to the right (see FIG. 30A as compared to FIG. 30), and, by reason of the synchronizing rods 470 also moves frame 280 of the in-feed assembly 78 to the right. Indeed, the opposite incremental movements of the opposed frames 280 are equalized such that the in-feed movement of the rolling gear dies 44, 46 is also equalized.

As further assurance for equalizing the incremental in-feed movements of the in-feed assemblies 78, 80, a pair of rack and pinion devices 476, 478, may be interposed between the opposed rolling gear die housings 82. Specifically, each rack and pinion device 476, 478 includes a pair of spaced parallel elongated racks 480, 482 with an intermediate pinion 484 meshingly engaged with the racks. The rack 480 is fixed, as by fasteners 486, to one of the housings 82 and its opposite end is journaled as at 488 to the opposite housing 82. The rack 482 is mounted in the same manner but its fastened and journaled ends are opposite from that of the rack 480. A similar construction is provided with respect to the rack and pinion device 478. The meshing engagement between the pinions 484 and their associated racks 480, 482 provides positive assurance that the incremental in-feed movement imparted to in-feed assembly 78 will likewise be imparted to in-feed assembly 80. In this manner, all operations performed on the workpiece 42 at the diametrically opposed locations are assured of uniformity.

Figure 33:
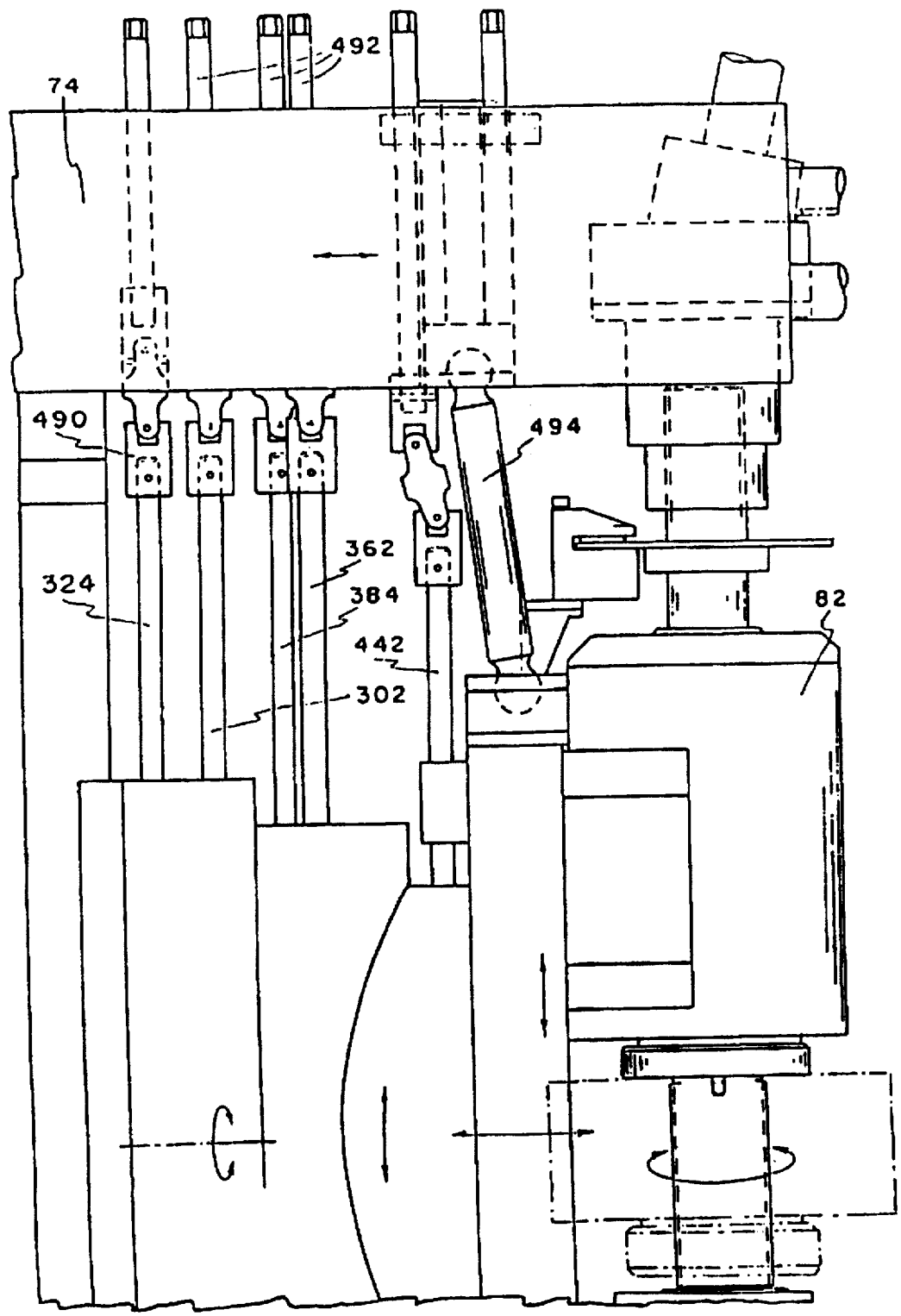
FIG. 33 is a side elevation view illustrating in greater detail upper regions of an in-feed assembly.

As seen in FIG. 33, all of the adjustment and actuating rods are connected at their upper ends via universal joints 490 to remote operating rods 492. In this manner, all of the positioning and locking operations can be performed by an operator at a remote, centralized, location. As also seen in FIG. 33, a gimbled mounting strut 494 is desirably positioned between each rolling gear die housing 82 and the main frame 74 to provide additional support against the through-feed roller.

Throughout operation of the gear roll finishing mechanism 110, various measurements are continuously taken under direction of controller 100. Appropriate operations are then performed. For example, viewing FIG. 2, with operation of the through-feed actuator 72, a suitable through-feed pressure sensor 520 is provided for sensing the force resisting entry of the workpiece 42 in the through-feed direction. When the force thereby being measured exceeds a predetermined value, operation of the actuator 72 is interrupted enabling an operator to determine the cause of the problem and correct it. In similar fashion, a suitable load cell 522 (FIG. 2) may be provided for sensing the force resisting entry of the workpiece in the in-feed direction. Again, the controller 100 is operable to interrupt operation of the in-feed actuator 88 for a desired length of time to locate and correct the problem. Additionally, a torque or current monitor 524 is appropriately provided for sensing the torque resisting rotation of the rolling gear dies 44, 46 while meshingly engaged with the workpiece 42. Once again, the controller 100 is operable to interrupt operation of the rotary drive actuator 248 for a sufficient period of time to locate and correct the difficulty.

Figure 10A:
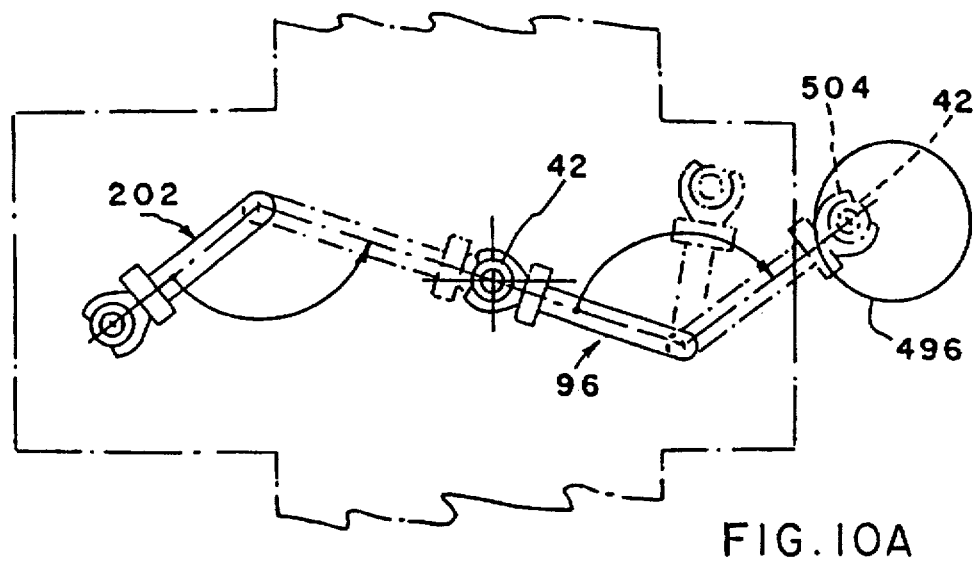
FIG. 10A is a top plan diagramatic view illustrating specific components depicted in FIG. 1 and different positions of those components.
Figure 10:
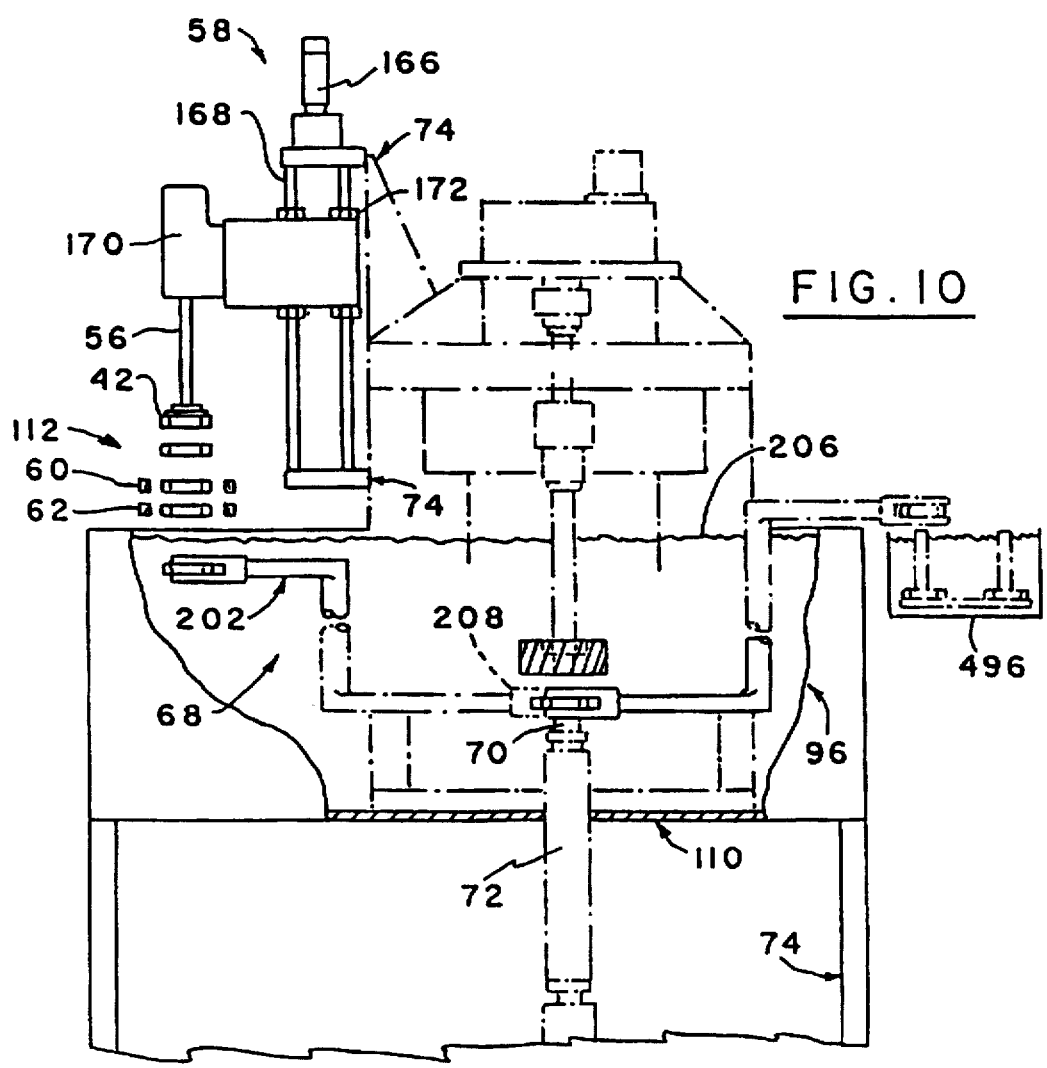
FIG. 10 is a side elevation diagramatic view, similar to FIG. 1, illustrating in greater detail pertinent components of the system of the invention.
Figure 12:
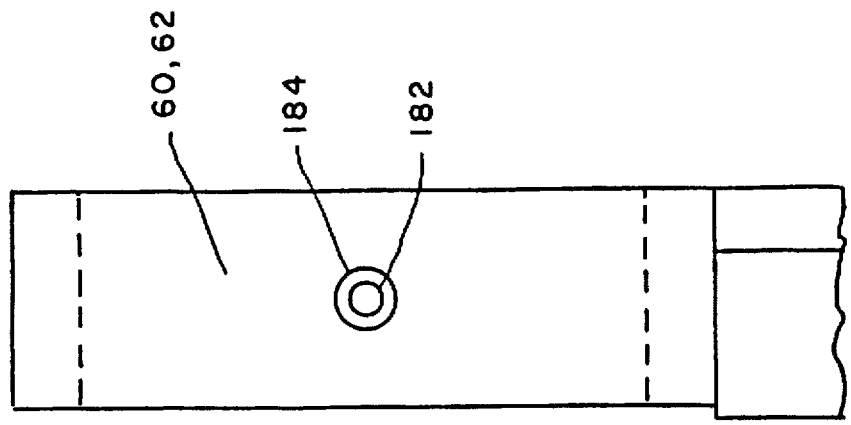
FIG. 12 is a front elevation view of the induction coil heater illustrated in FIG. 11.
Figure 11:
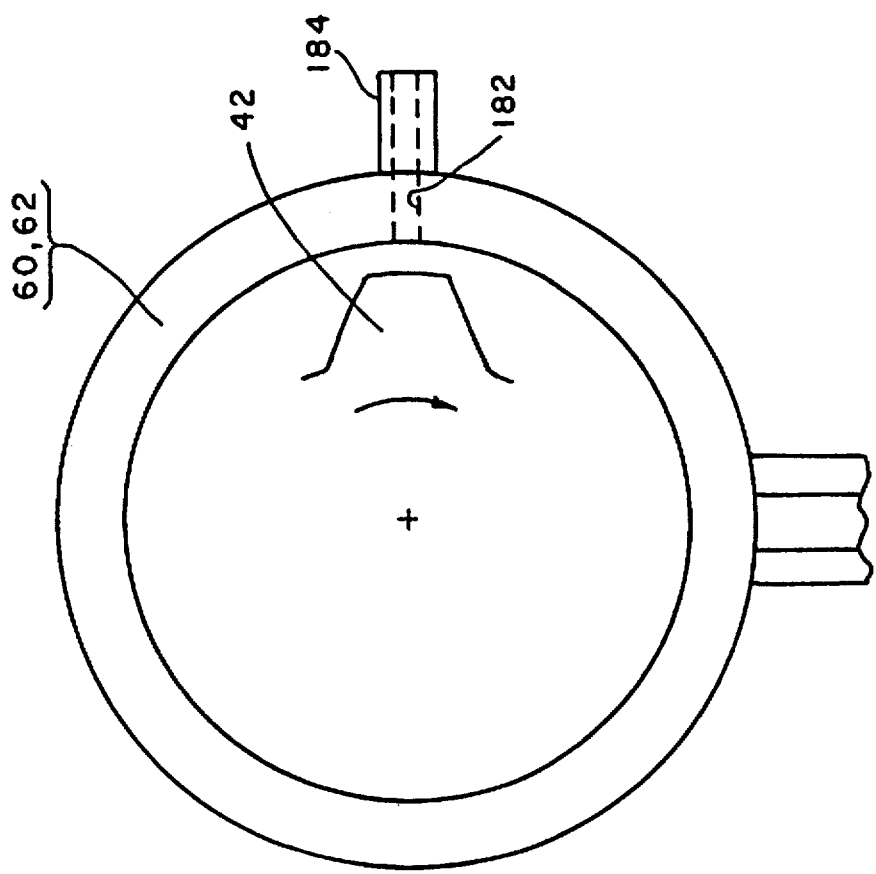
FIG. 11 is a detail side elevation view of an induction coil heater employed by the invention.

Upon conclusion of the net shaping operations performed by the gear roll finishing mechanism 110, a gear transfer mechanism 96 which is substantially similar in construction to the gear transfer mechanism 68 is operated to retrieve the workpiece 42 from the through-feed spindle 70, then to deliver it to the indexing quench station 98. The indexing quench station 98 includes a tank or vessel 496 which contains a thermally controlled liquid working medium 498 which may be similar to the quench media 64 utilized in the processing tank 66. In this instance, the working medium 498 is maintained at a substantially uniform temperature in the range of approximately 50° F. to 150° F. which is broadly considered to be "room temperature". The vessel 496 is so positioned in relation to the system that the gear transfer mechanism 96 always remains in the inert atmosphere provided by the enclosure 99. As seen in FIGS. 1, 10, and 10A, a transfer arm 500 of the gear transfer mechanism 96 is elevated until it overlies an upper rim 502 of the processing tank 66 positioning jaw 504 holding the workpiece 42 above and in line with a suitable spindle 506 of a gear receiving carousel 508. The jaws 504 are then operated to release the workpiece which is, at this stage of the operation, a net shaped gear, onto the spindle 506. In time, the completed workpiece descends through the working medium 498 until it comes to rest on the carousel 508 or on a preceding net shaped gear 42. Preferably, the carousel 508 is caused to rotate about a hub 510. This motion causes some measure of agitation of the working medium 498 and also presents the completed workpieces to an exit location 512 outside of the enclosure 99.

While preferred embodiments of the invention have been disclosed in detail, it should be understood by those skilled in the art that various other modifications may be made to the illustrated embodiments without departing from the scope of the invention as described in the specification and defined in the appended claims.

We claim:

1. A method of net shaping gear teeth of a high performance gear comprising the steps of:

(a) in a controlled metastable austenitic environment, rotating respectively on first and second generally parallel spaced axes, first and second rolling gear dies, each having an outer peripheral profiled surface extending between spaced lateral surfaces;

(b) rotatably supporting on a third axis generally parallel to the first and second axes within the controlled metastable austenitic environment a workpiece in the form of a near net shaped gear blank having an outer peripheral profiled surface extending between spaced lateral surfaces;

(c) advancing the workpiece along the third axis in a through-feed direction such that the outer peripheral surface of the workpiece slidably engages the first and second rolling gear dies and continues to advance until the workpiece is positioned substantially coextensive with the first and second rolling gear dies in the through-feed direction; and (d) simultaneously with step (c), after the workpiece and the first and second rolling gear dies are substantially enmeshed, advancing the first and second rolling gear dies, within a common plane generally containing the first, second, and third axes, in respectively opposite in-feed directions substantially perpendicular to the third axis until the outer peripheral surfaces, respectively, of the first and second rolling gear dies engage the workpiece at diametrically opposed locations and at near net shaped center distances establishing initial center distances between the first and third axes and between the second and third axes, respectively, when the workpiece and the rolling gear dies are initially engaged; and (e) continuing to advance the first and second rolling gear dies in the in-feed direction each by an additional increment of center distance thereby deforming the profile surfaces of each gear tooth resulting in final net shape of the gear teeth.

2. A method of net shaping gear teeth as set forth in claim 1 including at least one of the steps of:

(f) selectively adjusting the rolling gear dies along the first and second axes, respectively, to assume a desired orientation relative to the workpiece;

(g) selectively adjusting the rolling dies within the common plane to assume a desired orientation relative to the workpiece;

(h) selectively adjusting the rolling gear dies out of the common plane to assume a desired orientation relative to the workpiece; and (i) after completion of each of such steps (f), (g), and (h), as performed, securing the rolling gear dies in their respective desired orientations.

3. A method of net shaping gear teeth as set forth in claim 2 wherein step (g) includes the step of:

(j) mounting each of the rolling gear dies for pivotal movement about an axis generally perpendicular to the common plane; and wherein step (h) includes the step of:

(k) mounting each of the rolling gear dies for pivotal movement about an axis generally perpendicular to the third axis and lying within the common plane.

4. A method of net shaping gear teeth as set forth in claim 1 including the step of:

(f) coordinating rotation of the workpiece with the rolling gear dies to enable enmeshed engagement of the outer peripheral profiled surfaces of the rolling gear dies with the outer peripheral profiled surface of the workpiece during step (c).

5. A method of net shaping gear teeth as set forth in claim 4 wherein step (f) includes the steps of:

(g) rotating on the first axis adjacent the first rolling gear die and together with the first rolling gear die an indexing gear having an outer peripheral profiled surface extending between spaced lateral surfaces and having a modified lead-in surface;

(h) advancing the workpiece along the third axis in a through-feed direction such that the outer peripheral profiled surface of the workpiece is in meshing engagement with the outer peripheral profiled surface of the first rolling gear die.

6. A method of net shaping gear teeth as set forth in claim 1 wherein the workpiece has an outer peripheral profiled surface which is slightly oversized from that of a desired formed gear; and wherein each of the rolling gear dies has an outer peripheral profiled surface which is substantially similar to that of the desired shape.

7. A method of net shaping gear teeth as set forth in claim 1 including the step of:

(f) rotatably supporting on the first axis in side by side relationship with the first rolling gear die an index gear having a lead-in cam surface; and wherein step (c) includes the step of:

(g) advancing the workpiece along the third axis in the through-feed direction such that the outer peripheral surface of the workpiece first engages the lead-in cam surface, then the rolling gear dies.

8. A method of net shaping gear teeth of a high performance gear comprising the steps of:

(a) in a controlled metastable austenitic environment, rotatably supporting on a die axis a rolling gear die having an outer peripheral profiled surface extending between spaced lateral surfaces;

(b) rotatably supporting on a workpiece axis generally parallel to the die axis within the controlled metastable austenitic environment a workpiece in the form of a near net shaped gear blank having an outer peripheral profiled surface extending between spaced lateral surfaces such that the outer peripheral profiled surface of the workpiece is capable of meshing engagement with the outer peripheral profiled surface of the rolling gear die; and including at least one of the steps of:

(c) selectively adjusting the rolling gear die along the die axis to assume a desired orientation relative to the workpiece;

(d) selectively adjusting the rolling die within a common plane containing the die and workpiece axes to assume a desired orientation relative to the workpiece; and (e) selectively adjusting the rolling gear die out of the common plane to assume a desired orientation relative to the workpiece.

9. A method of net shaping gear teeth as set forth in claim 8 including the step of:

(f) after completion of each of such steps (c), (d), and (e), as performed, securing the rolling gear die in each respective desired orientation.

10. A method of net shaping gear teeth as set forth in claim 8 wherein step (d) includes the step of:

(f) mounting the rolling gear die for pivotal movement about an axis generally perpendicular to the common plane; and wherein step (e) includes the step of:

(g) mounting the rolling gear die for pivotal movement about an axis generally perpendicular to the workpiece axis and lying within the common plane.

11. A method of net shaping gear teeth of a high performance gear comprising the steps of:

(a) in a controlled metastable austenitic environment, rotating respectively on first and second generally parallel spaced axes, first and second rolling gear dies, each having an outer peripheral profiled surface extending between spaced lateral surfaces;

(b) rotatably supporting on a third axis generally parallel to the first and second axes within the controlled metastable austenitic environment a workpiece in the form of a near net shaped gear blank having an outer peripheral profiled surface extending between spaced lateral surfaces;

(c) positioning the workpiece along the third axis such that the outer peripheral surface of the workpiece meshingly engages the first and second rolling gear dies and is positioned substantially coextensive with the first and second rolling gear dies in the through-feed direction; and (d) after the workpiece and the first and second rolling gear dies are substantially enmeshed, advancing the first and second rolling gear dies, within a common plane generally containing the first, second, and third axes, in respectively opposite in-feed directions substantially perpendicular to the third axis until the outer peripheral surfaces, respectively, of the first and second rolling gear dies engage the workpiece at diametrically opposed locations and at near net shaped center distances establishing initial center distances between the first and third axes and between the second and third axes, respectively, when the workpiece and the rolling gear dies are initially engaged; and (e) continuing to advance the first and second rolling gear dies in the in-feed direction each by an additional increment of center distance thereby deforming the profile surfaces of each gear tooth resulting in final net shape of the gear teeth.

12. A method of net shaping gear teeth as set forth in claim 11 including the steps of:

(f) providing an individual in-feed assembly for each of the first and second rolling gear die assemblies;

(g) providing a single in-feed actuator means for simultaneously operating both of the first and second in-feed assemblies; and (h) operating the in-feed actuator means to advance the first and second rolling gear dies in the in-feed direction by equal incremental distances and at equal feed rates.

13. A method of net shaping gear teeth as set forth in claim 12 including at least one of the steps of:

(i) selectively adjusting the rolling gear dies along the first and second axes, respectively, to assume a desired orientation relative to the workpiece;

(j) selectively adjusting the rolling dies within the common plane to assume a desired orientation relative to the workpiece;

(k) selectively adjusting the rolling gear dies out of the common plane to assume a desired orientation relative to the workpiece; and (l) after completion of each of such steps (i), (j), and (k), as performed, securing the rolling gear dies in their respective desired orientations.

14. A method of net shaping gear teeth as set forth in claim 13 wherein the workpiece has an outer peripheral profiled surface which is slightly oversized from that of a desired formed gear; and wherein each of the rolling gear dies has an outer peripheral profiled surface which is substantially similar to that of the desired shape.

15. A method of net shaping gear teeth as set forth in claim 13 wherein step (j) includes the step of:

(m) mounting each of the rolling gear dies for pivotal movement about an axis generally perpendicular to the common plane; and wherein step (k) includes the step of:

(n) mounting each of the rolling gear dies for pivotal movement about an axis generally perpendicular to the third axis and lying within the common plane.

16. A method of net shaping gear teeth of a high performance gear comprising the steps of:

(a) in a controlled metastable austenitic environment, rotatably supporting on first and second axes, respectively, first and second rolling gear dies, each having an outer peripheral profiled surface extending between spaced lateral surfaces;

(b) rotatably supporting on a third axis generally parallel to the first and second die axes within the controlled metastable austenitic environment a workpiece in the form of a near net shaped gear blank having an outer peripheral profiled surface extending between spaced lateral surfaces such that the outer peripheral profiled surface of the workpiece is capable of meshing engagement with the outer peripheral profiled surfaces of the first and second rolling gear dies; and including at least one of the steps of:

(c) selectively adjusting the first and second rolling gear dies along the first and second die axes, respectively, to assume a desired orientation relative to the workpiece;

(d) selectively adjusting the first and second rolling dies within a common plane containing the first, second, and third axes to assume desired orientations, respectively, relative to the workpiece; and (e) selectively adjusting said first and second rolling gear dies, respectively, out of the common plane to assume desired orientations relative to the workpiece.

17. A method of net shaping gear teeth as set forth in claim 16 including the step of:

(f) after completion of each of such steps (c), (d), and (e), as performed, securing each of the rolling gear dies in each respective desired orientation.

18. A method of net shaping gear teeth as set forth in claim 16 wherein step (d) includes the step of:

(f) mounting each of the first and second rolling gear dies for pivotal movement about an axis generally perpendicular to the common plane; and wherein step (e) includes the step of:

(g) mounting each of the first and second rolling gear dies for pivotal movement about an axis generally perpendicular to the workpiece axis and lying within the common plane.

19. A method of net shaping gear teeth of a high performance gear comprising the steps of:

(a) in a controlled metastable austenitic environment, rotating respectively on first and second generally parallel spaced axes, first and second rolling gear dies, each having an outer peripheral profiled surface extending between spaced lateral surfaces;

(b) rotatably supporting on a third axis generally parallel to the first and second axes within the controlled metastable austenitic environment a workpiece in the form of a near net shaped gear blank having an outer peripheral profiled surface extending between spaced lateral surfaces;

(c) advancing the workpiece along the third axis in a through-feed direction such that the outer peripheral surface of the workpiece slidably engages the first and second rolling gear dies and continues to advance until the workpiece is positioned substantially coextensive with the first and second rolling gear dies in the through-feed direction; and (d) while holding fixed the relative spacing between the first and second axes, simultaneously with step (c), after the workpiece and the first and second rolling gear dies are substantially enmeshed, advancing the second rolling gear die, within a common plane generally containing the first, second, and third axes, in an in-feed direction substantially perpendicular to the third axis until the outer peripheral surfaces, respectively, of the first and second rolling gear dies engage the workpiece at diametrically opposed locations and at near net shaped center distances establishing initial center distances between the first and third axes and between the second and third axes, respectively, when the workpiece and the rolling gear dies are initially engaged; and (e) continuing to advance the second rolling gear die in the in-feed direction by an additional increment of center distance thereby deforming the profile surfaces of each gear tooth resulting in final net shape of the gear teeth.

20. A method of net shaping gear teeth as set forth in claim 19 including at least one of the steps of:

(f) selectively adjusting the rolling gear dies along the first and second axes, respectively, to assume a desired orientation relative to the workpiece;

(g) selectively adjusting the rolling dies within the common plane to assume a desired orientation relative to the workpiece;

(h) selectively adjusting the rolling gear dies out of the common plane to assume a desired orientation relative to the workpiece; and (i) after completion of each of such steps (f), (g), and (h), as performed, securing the rolling gear dies in their respective desired orientations.

21. A method of net shaping gear teeth as set forth in claim 20 wherein step (g) includes the step of:

(j) mounting each of the rolling gear dies for pivotal movement about an axis generally perpendicular to the common plane; and wherein step (h) includes the step of:

(k) mounting each of the rolling gear dies for pivotal movement about an axis generally perpendicular to the third axis and lying within the common plane.

22. A method of net shaping gear teeth as set forth in claim 19 including the step of:

(f) coordinating rotation of the workpiece with the rolling gear dies to enable enmeshed engagement of the outer peripheral profiled surfaces of the rolling gear dies with the outer peripheral profiled surface of the workpiece during step (c).

23. A method of net shaping gear teeth as set forth in claim 22 wherein step (f) includes the steps of:

(g) rotating on the first axis adjacent the first rolling gear die and together with the first rolling gear die an indexing gear having an outer peripheral profiled surface extending between spaced lateral surfaces and having a modified lead-in surface;

(h) advancing the workpiece along the third axis in a through-feed direction such that the outer peripheral profiled surface of the workpiece is cammed into meshing engagement with the outer peripheral profiled surface of the first rolling gear die.

24. A method of net shaping gear teeth as set forth in claim 19 wherein the workpiece has an outer peripheral profiled surface which is slightly oversized from that of a desired formed gear; and wherein each of the rolling gear dies has an outer peripheral profiled surface which is substantially similar to that of the desired shape.

25. A method of net shaping gear teeth as set forth in claim 19 including the step of:

(f) rotatably supporting on the first axis in side by side relationship with the first rolling gear die an index gear having a lead-in cam surface; and wherein step (c) includes the step of:

(g) advancing the workpiece along the third axis in the through-feed direction such that the outer peripheral surface of the workpiece first engages the lead-in cam surface, then the rolling gear dies.

* * * * *